United States Patent
Jacob et al.

(10) Patent No.: US 9,961,017 B2
(45) Date of Patent: May 1, 2018

(54) DEMAND POLICY-BASED RESOURCE MANAGEMENT AND ALLOCATION SYSTEM

(71) Applicant: Oracle International Corporation, Redwood Shores, CA (US)

(72) Inventors: Vinod Pathikulangara Jacob, Bangalore (IN); Gopal Kirsur, San Ramon, CA (US); Albin Abraham Jacob, Bangalore (IN); Muhammad Riyas Vattakkandy, Bangalore (IN); Kiran Malpati Ravindraiah, Bangalore (IN); Nirguna Kota, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 281 days.

(21) Appl. No.: 14/819,815

(22) Filed: Aug. 6, 2015

(65) Prior Publication Data

US 2016/0043967 A1    Feb. 11, 2016

Related U.S. Application Data

(60) Provisional application No. 62/035,370, filed on Aug. 8, 2014.

(51) Int. Cl.
*H04L 12/911* (2013.01)
*H04L 29/08* (2006.01)
*G06F 9/50* (2006.01)

(52) U.S. Cl.
CPC .............. *H04L 47/828* (2013.01); *G06F 9/50* (2013.01); *G06F 9/5027* (2013.01);
(Continued)

(58) Field of Classification Search
CPC .................................. G06F 9/50; H04L 47/828
See application file for complete search history.

(56) References Cited

U.S. PATENT DOCUMENTS

| 8,370,312 B1 | 2/2013 | Sawhney et al. |
| 8,484,353 B1 | 7/2013 | Johnson et al. |

(Continued)

FOREIGN PATENT DOCUMENTS

| CN | 102577270 B | 12/2014 |
| CN | 106576114 | 4/2017 |

(Continued)

OTHER PUBLICATIONS

U.S. Appl. No. 14/819,922, filed Aug. 6, 2015, Jacob et al.
(Continued)

*Primary Examiner* — Lashonda Jacobs
(74) *Attorney, Agent, or Firm* — Kilpatrick Townsend & Stockton LLP

(57) ABSTRACT

The present disclosure relates generally to improving the management and provisoning of configurable computing resources. Certain techniques are disclosed herein for managing and provisoning the configurable computing resources based on resource policies. One of the techniques includes determining a value indicating a real-time demand for a resource within a resource pool based on an aggregate of request data. The aggregate of the request data is obtained from any number of previously received orders for services that included the resource as at least a part of enabling the service. The technique may also include generating or updating one or more demand policies for allocation of the resource based on the determined value indicating the real-time demand for the resource, pre-creating the resource
(Continued)

based on the one or more demand policies, and allocating the pre-created resource to one or more users based on the one or more demand policies.

17 Claims, 15 Drawing Sheets

(52) U.S. Cl.
CPC .......... *G06F 9/5055* (2013.01); *G06F 9/5072* (2013.01); *H04L 67/1002* (2013.01); *H04L 67/16* (2013.01); *H04L 67/306* (2013.01); *H04L 67/32* (2013.01)

(56) References Cited

U.S. PATENT DOCUMENTS

| | | | |
|---|---|---|---|
| 8,615,528 | B2 | 12/2013 | Shah |
| 8,619,779 | B2 | 12/2013 | Li et al. |
| 8,701,115 | B2 | 4/2014 | Bhandari et al. |
| 8,832,249 | B2 | 9/2014 | Kuo et al. |
| 8,850,449 | B2 | 9/2014 | Hiltunen et al. |
| 8,856,386 | B2 | 10/2014 | Dutta et al. |
| 8,909,767 | B2 | 12/2014 | Sunkara et al. |
| 8,954,487 | B2 | 2/2015 | Jung et al. |
| 9,032,077 | B1* | 5/2015 | Klein .................. H04L 29/08 370/395.21 |
| 9,154,589 | B1* | 10/2015 | Klein .................. H04L 69/329 |
| 9,239,996 | B2 | 1/2016 | Moorthi et al. |
| 9,256,467 | B1 | 2/2016 | Singh et al. |
| 9,274,849 | B1 | 3/2016 | Estes et al. |
| 9,400,689 | B2 | 7/2016 | Banzhaf et al. |
| 9,612,865 | B2* | 4/2017 | Cao .................. G06F 9/4818 |
| 9,621,427 | B1 | 4/2017 | Shah et al. |
| 9,621,435 | B2 | 4/2017 | Vasudevan et al. |
| 2002/0120744 | A1 | 8/2002 | Chellis et al. |
| 2003/0135609 | A1 | 7/2003 | Carlson et al. |
| 2004/0167959 | A1 | 8/2004 | Doyle et al. |
| 2004/0267865 | A1* | 12/2004 | Cuervo ............... H04L 41/0893 709/200 |
| 2006/0085530 | A1 | 4/2006 | Garrett |
| 2006/0116998 | A1* | 6/2006 | Marr .................... G06Q 10/087 |
| 2006/0160546 | A1* | 7/2006 | Tang .................. H04L 41/5054 455/461 |
| 2008/0080396 | A1 | 4/2008 | Meijer et al. |
| 2010/0325191 | A1 | 12/2010 | Jung et al. |
| 2011/0213884 | A1 | 9/2011 | Ferris et al. |
| 2012/0239792 | A1 | 9/2012 | Banerjee et al. |
| 2012/0271949 | A1 | 10/2012 | Radhakrishnan et al. |
| 2012/0324112 | A1 | 12/2012 | Dow et al. |
| 2013/0031028 | A1 | 1/2013 | Martin |
| 2013/0080619 | A1 | 3/2013 | Assuncao et al. |
| 2013/0097601 | A1 | 4/2013 | Podvratnik et al. |
| 2013/0185438 | A1* | 7/2013 | Lumezanu .......... H04L 12/4641 709/226 |
| 2014/0019961 | A1 | 1/2014 | Neuse et al. |
| 2014/0225896 | A1* | 8/2014 | Zhang .................. H04L 45/22 345/440 |
| 2014/0273928 | A1* | 9/2014 | Dobbs .................. H04W 4/24 455/406 |
| 2014/0279353 | A1 | 9/2014 | Findlan et al. |
| 2014/0344809 | A1 | 11/2014 | Jin et al. |
| 2014/0365662 | A1 | 12/2014 | Dave et al. |
| 2015/0113144 | A1 | 4/2015 | Bauer et al. |
| 2015/0120937 | A1 | 4/2015 | Mordani et al. |
| 2015/0163157 | A1 | 6/2015 | Hao et al. |
| 2016/0043968 | A1 | 2/2016 | Jacob et al. |
| 2016/0043970 | A1 | 2/2016 | Jacob et al. |
| 2016/0142338 | A1 | 5/2016 | Steinder et al. |
| 2016/0253195 | A1 | 9/2016 | Banzhaf et al. |

FOREIGN PATENT DOCUMENTS

| | | |
|---|---|---|
| CN | 106664321 | 5/2017 |
| EP | 3177995 | 6/2017 |
| EP | 3177997 | 6/2017 |
| JP | 2017524202 | 8/2017 |
| JP | 2017529593 | 10/2017 |
| KR | 20170042638 | 4/2017 |
| WO | 2011/041159 A1 | 4/2011 |
| WO | 2013/009287 A1 | 1/2013 |
| WO | 2014039918 A1 | 3/2014 |
| WO | 2014/150158 A1 | 9/2014 |
| WO | 2014/165507 A1 | 10/2014 |
| WO | 2016022908 A1 | 2/2016 |
| WO | 2016022925 A2 | 2/2016 |
| WO | 2016022925 A3 | 2/2016 |

OTHER PUBLICATIONS

U.S. Appl. No. 14/819,827, filed Aug. 6, 2015, Jacob et al.
International Patent Application No. PCT/US2015/044187 filed Aug. 7, 2015, Oracle International Corporation.
International Patent Application No. PCT/US2015/044216 filed Aug. 7, 2015, Oracle International Corporation.
U.S. Appl. No. 14/819,827, Non-Final Office Action dated Jun. 2, 2017, 17 pages.
U.S. Appl. No. 14/819,922, Non-Final Office Action dated Jun. 5, 2017, 12 pages.
International Application No. PCT/US2015/044216, Invitation to Restrict or Pay Additional Fees dated Jul. 11, 2016, 5 pages.
International Application No. PCT/US2015/044216, International Preliminary Report on Patentability dated Dec. 23, 2016, 22 pages.
International Application No. PCT/US2015/044187, International Preliminary Report on Patentability dated Oct. 7, 2016, 10 pages.
International Application No. PCT/US2015/044216, Written Opinion dated Oct. 13, 2016, 19 pages.
International Application No. PCT/US2015/044187, International Search Report and written opinion dated Oct. 22, 2015, 14 pages.
International Application No. PCT/US2015/044216, International Search Report and Written Opinion dated Feb. 24, 2016, 25 pages.
International Application No. PCT/US2015/044216, Invitation to Pay Add'l Fees and Partial Search Rpt dated Oct. 30, 2015, 5 pages.
International Application No. PCT/US2015/044187, Written Opinion dated Jul. 5, 2016, 9 pages.
"Final Office Action" issued in U.S. Appl. No. 14/819,827, dated Dec. 13, 2017, 20 pages.
"Notice of Allowance" issued in U.S. Appl. No. 14/819,922, dated Nov. 15, 2017, 10 pages.

\* cited by examiner ized. The method may additionally include correlating the order with at least one other order from the previously parsed orders based on at least one component of the request data being the same between the order and the at least one other order, and identifying at least one resource set based on the correlating of the order with the at least one other order, wherein the at least one resource set includes the resource from the order and another resource requested from the at least one other order.

DEMAND POLICY-BASED RESOURCE MANAGEMENT AND ALLOCATION SYSTEM

CROSS-REFERENCE TO RELATED APPLICATION

The present application claims priority and benefit from U.S. Provisional Application No. 62/035,370, filed Aug. 8, 2014, entitled "RESOURCE MANAGEMENT AND ALLOCATION SYSTEM," the entire content of which is incorporated herein by reference for all purposes.

BACKGROUND

The present disclosure relates generally to computer systems and software, and more particularly, to techniques for facilitating and automating the provision of services in a distributed computing environment. A distributed computing environment such as a cloud computing environment is a model of service delivery for enabling convenient, on-demand network access to a shared pool of configurable computing resources (e.g. networks, network bandwidth, servers, PODs, processing, memory, storage, applications, virtual machines, services, etc.) that can be rapidly provisioned and released with minimal management effort or interaction with a provider of the service. The provider may provide a variety of services via the distributed computing environment. These services may include one or more services provided under Software as a Service (SaaS) category, Platform as a Service (PaaS) category, Infrastructure as a Service (IaaS) category, or other categories of services including hybrid services.

A user (e.g., a customer or client), via an order or service subscription, may order one or more of the services provided by the distributed computing environment. The distributed computing environment then performs processing (e.g., provisioning, managing, and tracking) to provide the services requested within the user's subscription order. Typically, when the provider (e.g., a cloud service provider) receives an order or service subscription subscribing to the one or more services, the distributed computing environment provisions or allocates the configurable computing resources for the one or more services to the requesting user. However, the requesting user does not have control over how the configurable computing resources are provisioned or allocated nor does the distributed computing environment manage the configurable computing resources to anticipate demand from the requesting user for the configurable computing resources. These challenges may present automation, performance, and usability issues, which cannot be readily addressed by existing distributed computing environments that provision or allocate configurable computing resources.

BRIEF SUMMARY

The present disclosure relates generally to improving the management and provisoning of configurable computing resources. Certain techniques are disclosed herein for managing and provisoning the configurable computing resources based on resource policies in order to reduce or nullify infrastructure setup time, automate repeatable complex integrations, avoid human intervention, and provide better management and usability of the configurable computing resources.

In some embodiments, the present invention provides the user with the ability to control the provisioning of the configurable computing resources (e.g. networks, network bandwidth, servers, PODs, processing, memory, storage, applications, virtual machines, services, etc.) to some extent based on the resource policies. For example, the user can have the ability to specify a geographical location of where the resources are provisioned; if the service is a multi-tenant service (e.g., the same resource can be shared by two separate users), the user can have the ability to indicate that the user does not want to share the resource; if the service is a multi-tenant service, the user can have the ability to indicate an affinity towards a particular tenant (e.g., the user can have the ability to indicate that they want to share a resource with tenant X), or in contrast, the user can have the ability to indicate that they do not want to share with a particular tenant; the user can have the ability to contribute one or more configurable computing resources to a resource pool of the distributed computing environment in exchange for requestable configurable computing resources; the user can have the ability to control separate POD provisioning and service provisioning for services; etc.

In some embodiments, the present invention provides the distributed computing environment with the ability to manage, anticipate, and pre-create configurable computing resources and setups or groups of configurable computing resources based on the resource policies. For example, the distributed computing environment can have the ability to pre-create a number of configurable computing resources automatically based on the resource policies and a current percentage of service requests that include the configurable computing resource; the distributed computing environment can have the ability to pre-create a number of configurable computing resources automatically based on the resource policies and the progress of a new service or product release; the distributed computing environment can have the ability to monitor the percentage of demand for sets or groups of resources used together and pre-create or create-on-demand the identified sets or groups of configurable computing resources based on the resource policies and demand for the configurable computing resources; the distributed computing environment can have the ability to control a number of configurable computing resources that a user can or has contributed to the distributed computing environment and a number of configurable computing resources that can be provided or have been provided to the user in exchange for the contributed configurable computing resources based on the resource policies and demand for the configurable computing resources; etc.

In at least one embodiment, a method is performed by a computing system, and the method includes receiving an order by a user for a service. The service is enabled in part by allocation of a resource. The method may further include parsing the order to identify request data comprising a requestor, the resource, and a request time. The method may further include adding the request data to an aggregate data structure, wherein the aggregate data structure includes an aggregate of the request data for previously parsed orders. The method may further include determining a value indicating a real-time demand for the resource based on the aggregate data structure. The method may additionally include correlating the order with at least one other order from the previously parsed orders based on at least one component of the request data being the same between the order and the at least one other order, and identifying at least one resource set based on the correlating of the order with the at least one other order, wherein the at least one resource set includes the resource from the order and another resource requested from the at least one other order.

Optionaly, the method may further include generating or updating one or more demand policies for allocation of the resource based on the determined value indicating the real-time demand for the resource, pre-creating the resource based on the one or more demand policies, and allocating the pre-created resource to one or more users based on the one or more demand policies. The value indicating the real-time demand for the resource is determined using a current request volume for the resource obtained from the aggregate of the request data for the previously parsed orders.

In at least one embodiment, a non-transitory machine readable storage medium is provided for that includes instructions stored thereon that when executed by one or more processors cause the one or more processors to perform a method including determining a value indicating a real-time demand for a resource within a resource pool based on an aggregate of request data. The aggregate of the request data is obtained from any number of previously received orders for services that included the resource as at least a part of enabling the service. The method performed by the one or more processors may further include generating or updating one or more demand policies for allocation of the resource based on the determined value indicating the real-time demand for the resource pre-creating the resource based on the one or more demand policies, and allocating the pre-created resource to one or more users based on the one or more demand policies.

Optionally, the calculating the real time demand comprises determining the value indicating the real-time demand comprises determining a percentage of orders that include the resource within a particular time period using the aggregate of the request data for the previously received orders.

In at least one embodiment, a system is provided for that includes one or more processors and non-transitory machine readable storage medium. The system may further include program instructions configured to determine a value indicating a real-time demand for a resource within a resource pool based on an aggregate of request data. The aggregate of the request data is obtained from any number of previously received orders for services that included the resource as at least a part of enabling the services. The program instructions may be further configured to correlate an order for a service with at least one other order from the previously received orders based on at least one component of the request data being the same between the order and the at least one other order, and identify at least one resource set based on the correlating of the order with the at least one other order. The at least one resource set includes the resource from the order and another resource requested from the at least one other order. The program instructions may be further configured to track utilization of the resource within the resource pool, and generate or update one or more demand policies for allocation of resource based on at least one of: (i) the determined value indicating the real-time demand for the resource, (ii) the at least one resource set that includes the resource, and (iii) the tracked utilization for the resource. The program instructions may be further configured to at least one of: (i) pre-create the resource, (ii) add the resource to the resource pool, (iii) clean the resource, based on the one or more demand policies. The program instructions are stored on the non-transitory machine readable storage medium for execution by the one or more processors.

Optionally, the system may further comprise program instructions to allocate the resource to one or more users based on the one or more demand policies.

The foregoing, together with other features and embodiments will become more apparent upon referring to the following specification, claims, and accompanying drawings.

DETAILED DESCRIPTION

Figure 1:
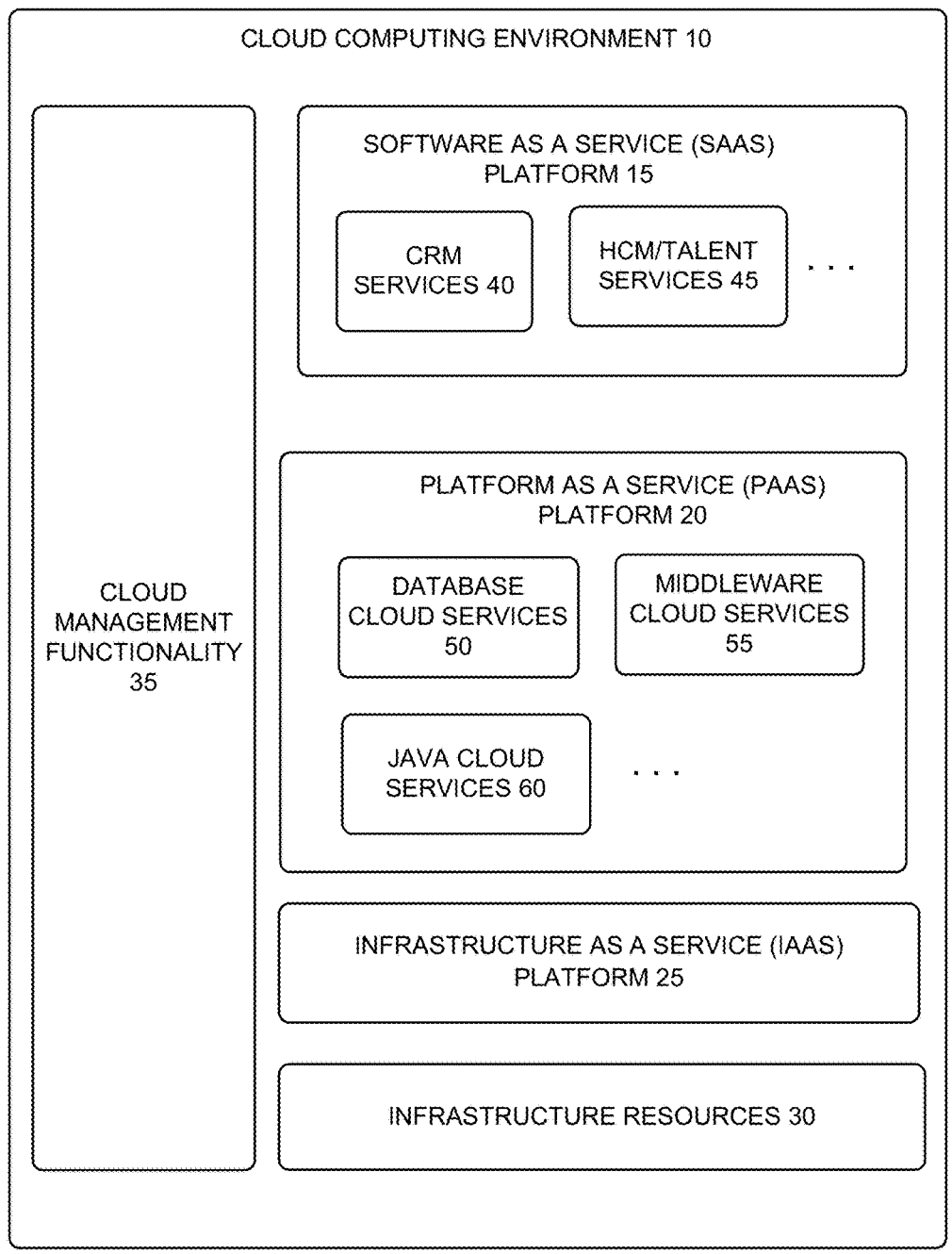
FIG. 1 is a logical view of a cloud infrastructure system according to an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The present disclosure relates generally to managing and allocating configurable computing resources based on resource policies. For purposes of this disclosure, it is assumed that the management and allocation of the configurable computing resources is performed at least in part in response to one or more subscription orders subscribing to one or more services provided by a service provider of a distributed computing environment such as a cloud computing environment. While some embodiments have been disclosed herein with respect to managing and allocating configurable computing resources provided under service models including SaaS, PaaS, and IaaS, this is not intended to be restrictive. In addition to SaaS, PaaS, and IaaS, the teachings disclosed herein can also be applied to other service models. For example, the teachings are applicable to any model of service delivery for enabling convenient, on-demand network access to a shared pool of configurable computing resources (e.g. networks, network bandwidth, servers, PODs, processing, memory, storage, applications, virtual machines, services, etc.).

In certain embodiments, a distributed computing environment such as a cloud computing environment may include a suite of applications, middleware and database service offerings that are delivered to a user in a self-service, subscription-based, elastically scalable, reliable, highly available, and secure manner. The cloud computing environment may provide many capabilities including, but not limited to, provisioning, managing and tracking a user's subscription for services and resources in the cloud computing environment, providing predictable operating expenses to users utilizing the services in the cloud computing environment, providing robust identity domain separation and protection of a user's data in the cloud computing environment, providing users with a transparent architecture and control of the design of the cloud computing environment, providing users assured data protection and compliance with data privacy standards and regulations, providing users with an integrated development experience for building and deploying services in the cloud computing environment and providing users with a seamless integration between business software, middleware, database and infrastructure services in the cloud computing environment.

In certain embodiments, services provided by the cloud infrastructure system may include a host of services that are made available to users of the cloud computing environment on demand such as online data storage and backup solutions, Web-based e-mail services, hosted office suites and document collaboration services, database processing, managed technical support services and the like. Services provided by the cloud computing environment can dynamically scale to meet the needs of its users. A specific instantiation of a service provided by cloud computing environment is referred to herein as a service instance. In general, any service made available to a user via a communication network such as the Internet from a cloud service provider's system is referred to as a cloud service. Typically, in a public cloud environment, servers and systems that make up the cloud service provider's system are different from the user's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1 is a logical view of a cloud computing environment 10 according to some embodiments of the present invention. Cloud computing environment 10 may provide a variety of services via a cloud or networked environment. These services may include one or more services provided under SaaS, PaaS, IaaS, or other categories of services including hybrid services. A user, via a subscription order, may order one or more services provided by cloud computing environment 10. Cloud computing environment 10 then performs processing to provide the services in the user's subscription order.

Cloud computing environment 10 may provide the cloud services via different deployment models. For example, services may be provided under a public cloud model where cloud computing environment 10 is owned by an organization selling cloud services (e.g., owned by Oracle) and the services are made available to the general public or different industry enterprises. As another example, services may be provided under a private cloud model where cloud computing environment 10 is operated solely for a single organization and may provide services for one or more entities within the organization. The cloud services may also be provided under a community cloud model where cloud infrastructure system 100 and the services provided by cloud computing environment 10 are shared by several organizations in a related community. The cloud services may also be provided under a hybrid cloud model, which is a combination of two or more different models.

As shown in FIG. 1, cloud computing environment 10 may comprise multiple components, which working in conjunction, enable provision of services provided by cloud computing environment 10. In the embodiment illustrated in FIG. 1, cloud computing environment 10 includes a SaaS platform 15, a PaaS platform 20, an IaaS platform 25, infrastructure resources 30, and cloud management functionality 35. These components may be implemented in hardware, or software, or combinations thereof.

SaaS platform 15 is configured to provide cloud services that fall under the SaaS category. For example, SaaS platform 15 may provide capabilities to build and deliver a suite of on-demand applications on an integrated development and deployment platform. SaaS platform 15 may manage and control the underlying software and infrastructure for providing the SaaS services. By utilizing the services provided by SaaS platform 15, users can utilize applications executing on cloud computing environment 10. Users can acquire the application services without the need for users to purchase separate licenses and support.

Various different SaaS services may be provided. Examples include without limitation services that provide solutions for sales performance management, enterprise integration and business flexibility for large organizations, and the like. In one embodiment, the SaaS services may include User Relationship Management (CRM) services 40 (e.g., Fusion CRM services provided by the Oracle cloud), Human Capital Management (HCM)/Talent Management services 45, and the like. CRM services 40 may include services directed to reporting and management of a sales activity cycle to a user, and others. HCM/Talent services 45 may include services directed to providing global workforce lifecycle management and talent management services to a user.

Various different PaaS services may be provided by PaaS platform 20 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 20 may manage and control the underlying software and infrastructure for providing the PaaS services. Users can acquire the PaaS services provided by cloud computing environment 10 without the need for users to purchase separate licenses and support. Examples of PaaS services include without limitation Oracle Java Cloud Service (JCS), Oracle Database Cloud Service (DBCS), and others.

By utilizing the services provided by PaaS platform 20, users can utilize programming languages and tools supported by cloud computing environment 10 and also control the deployed services. In some embodiments, PaaS services provided by the cloud computing environment 10 may include database cloud services 50, middleware cloud services (e.g., Oracle Fusion Middleware services) 55 and Java cloud services 60. In one embodiment, database cloud services 50 may support shared service deployment models that enable organizations to pool database resources and offer users a database-as-a-service in the form of a database cloud, middleware cloud services 55 provides a platform for users to develop and deploy various business applications and Java cloud services 60 provides a platform for users to deploy Java applications, in the cloud computing environment 10. The components in SaaS platform 15 and PaaS platform 20 illustrated in FIG. 1 are meant for illustrative purposes only and are not intended to limit the scope of embodiments of the present invention. In alternate embodiments, SaaS platform 15 and PaaS platform 20 may include additional components for providing additional services to the users of cloud computing environment 10.

Various different IaaS services may be provided by IaaS platform 20. The IaaS services facilitate the management and control of the underlying computing resources such as storage, networks, and other fundamental computing resources for users utilizing services provided by the SaaS platform and the PaaS platform.

In certain embodiments, the cloud computing environment 10 includes infrastructure resources 30 for providing the resources used to provide various services to users of the cloud computing environment 10. In one embodiment, infrastructure resources 30 includes pre-created and optimized combinations (e.g., groups or sets) of hardware such as servers, storage and networking resources to execute the services provided by the PaaS platform and the SaaS platform.

In certain embodiments, cloud management functionality 35 provides comprehensive management of cloud services (e.g., SaaS, PaaS, IaaS services) in the cloud computing environment 10. In one embodiment, cloud management functionality 35 includes capabilities for provisioning, managing and tracking a user's order or subscription received by the cloud infrastructure system 10, and the like.

Figure 2:
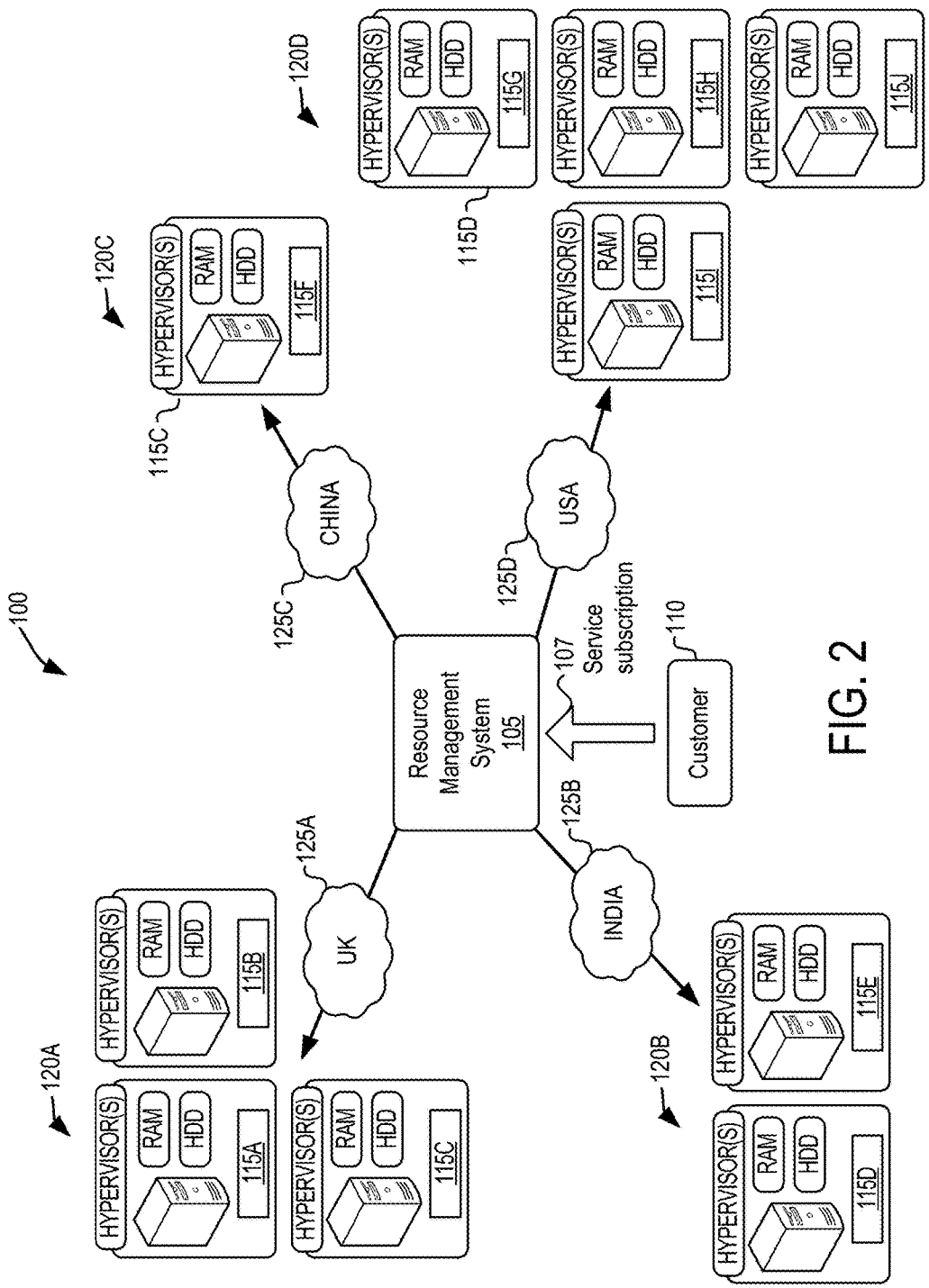
FIG. 2 depicts a simplified diagram of a policy-based resource allocation and management system according to an embodiment of the present invention.

FIG. 2 depicts a simplified high level diagram of a policy-based resource allocation and management system 100 according to an embodiment of the present invention. As shown in FIG. 2, a resource management system 105 (e.g., a computing system of a service provider comprising one or more computing devices) can receive an order or service subscription 107 from a user or user 110 (e.g., a client or computing device) for one or more configurable computing resources 115A-115J. The resources 115A-115J provided to the user 110 may be located in one or more data centers 120A-120D, which may be located in different geographical regions 125A-120-D. Traditional service providers provision and allocate resources in a manner that is most cost effective to the provider, and do not enable the user to define how or where the resources are provisioned to best suit the user's needs. Additionally, prior art systems are reactive in that they provide resources on demand. However, these systems do not anticipate requests or identify and provide sets or groups of resources based on current demand. Embodiments of the present invention address these and other issues.

In accordance with aspects of the present invention, the one or more configurable computing resources 115A-115J (i.e., contributable or requestable resource types) can be networks, network bandwidth, servers, PODs, processing, memory, storage, applications, virtual machines, services, etc. A POD is a logical entity that can represent one of the following: a pre-provisioned anonymous single-tenant deployment (as is the case for the Java service); or a multi-tenant stack (physical or virtualized) that serves multiple tenants (as is the case for the database service). For example, a POD is a deployment of a service on a physical stack. A POD can house one or more service instances. A POD can be created a priori or can be created on-demand when a service instance is created for a given customer. In some instances, a POD is an instantiation of a software stack for running a service. A POD is thus used to run a service. For example, a POD corresponding to Java service may comprise a stack of virtual machines. As another example, a POD for a database service may comprise an instance of a database. A POD may be considered as a subsystem that is capable of hosting a service. Different PODs may be used for different services.

Figure 3:
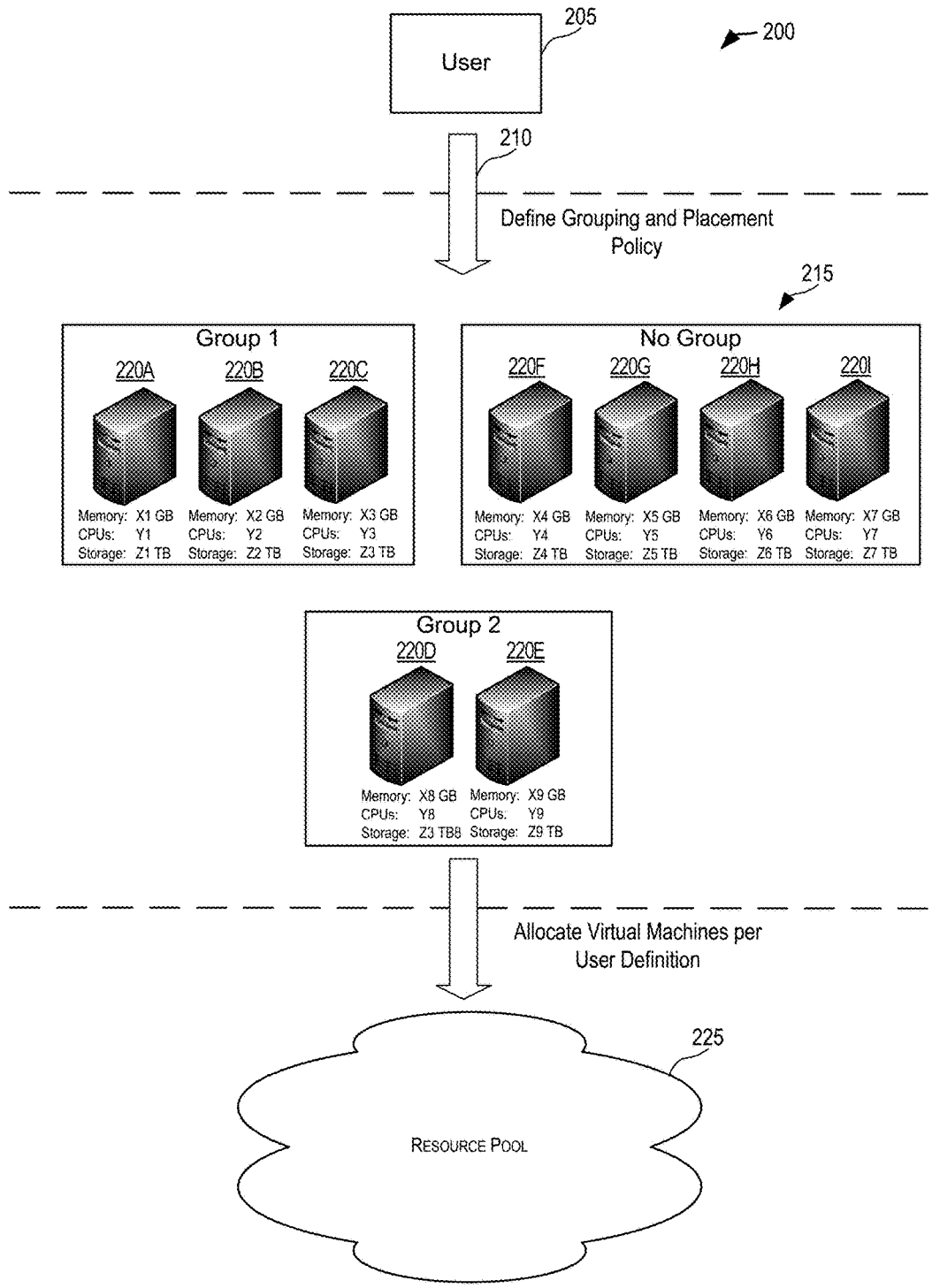
FIG. 3 depicts an example of placement policy-based resource allocation and management according to an embodiment of the present invention.

FIG. 3 depicts an example flow diagram 200 of placement policy-based resource allocation and management according to an embodiment of the present invention. As described above, typical service providers do not enable users or users to define how and where their requested configurable computing resources are provisioned. Instead, configurable computing resources are typically allocated in whatever manner is most cost effective for the service provider. However, the best allocation for the service provider may not provide the best experience for the end user.

Embodiments of the present invention expose fine-grained resource allocation capabilities to the end user by enabling the user to define placement policies (i.e., resource policies) for their configurable computing resource requests. This may provide a number of advantages to the end user. For example, in the context of IaaS, the end user may be concerned about security of their data, particularly where their data may be stored on the same computing node as other users' data. Although IaaS providers make guarantees as to data security, for some users these guarantees may be insufficient. The user may instead want their own dedicated computing nodes that are not shared with any other users. Other users may be less concerned with data security, but may have particular performance or redundancy requirements that can be best served by specifically defined resource allocations. As such, embodiments of the present invention include a plurality of placement policies to accommodate end users' needs. As used herein, the placement policies refer to the rules that define how the configurable computing resources (e.g., computing nodes) are allocated for servicing a user.

In accordance with aspects of the present invention, the placement policies can allocate resources based on a number of different factors. For example, in the context of IaaS, where performance is an issue, computing resources may be grouped to run on a same hypervisor or set of hypervisors (e.g., a virtual machine monitor (VMM) or set of VMMs, which is a piece of computer software, firmware, and/or hardware that creates and runs virtual machines (VMs)). This may improve network communication and request/response times compared to resources spread between different hypervisors or sets of hypervisors, by reducing calls to the networking layer. For example, shared storage resources may be best allocated in the same hypervisor or set of hypervisors as its associated compute nodes to improve performance. As described above, security concerns can be addressed by running resources on dedicated hypervisors. This can be used to secure data from malicious or inadvertent accesses between different users or between sets of data controlled by the same user that need to be maintained separately. Likewise, geographic restrictions (e.g., limitations on the locations of data centers that host the resources) may also be provided to meet particular security, performance, or regulatory requirements. Additionally, isolation and/or redundancy can be maintained by running particular resources on separate hypervisors or sets of hypervisors. This can be used to preserve data in case of failure or to perform management, administrative, or infrastructure operations (such as patching) on one set of resources, without affecting other resources (e.g., to reduce downtime). In some embodiments, an enterprise design, integration requirement, or other functional requirement may require that components can interoperate only within the scope of same hypervisor (e.g., software defined infrastructure (SDI)).

Examples of placement policies, in the context of IaaS, include a dedicated hypervisors policy in which allocated resources run on virtual machines placed to a set of hypervisors. The set of hypervisors are dedicated in that they are not shared with other users. A best fit placement policy may allocate virtual machines to a set of hypervisors to optimize computing resource utilization. For example, the set of hypervisors may be shared with other users (and run other resources), as needed, to save resources, maximize resource utilization, reduce fragmentation, or other resource optimization. In some embodiments, the best fit placement policy may be selected by default where no placement policy is specified by the user. A group fit placement policy may be used where a particular portion of computing resources are to be run together. Virtual machines can be grouped together and run on one or more hypervisors in the same hypervisor pool. Placement policies may be customized as needed by end users to create hybrid placement policies that incorporate features from one or more of the above described, or any other, placement policies.

As shown in FIG. 3, a user 205 can submit an order or service subscription 210 to a resource manager (e.g., resource management system 105 described with respect to FIG. 2) that includes a topology definition 215. The topology definition may include requirements for individual configurable computing resources (e.g., compute nodes) such as memory, number of CPUs, storage requirements, and other specifications as required by the end user. For example, as shown in topology definition 215, the order or service subscription 210 includes nine virtual machines 220A-220I, each with its own specification (e.g., memory, number of CPUs, and storage). The nine virtual machines are grouped such that group 1 includes three virtual machines 220A-220C, group 2 includes 2 virtual machines 220D-220E, and the remaining four virtual machines 220E-220I are ungrouped. This topology definition 215 represents a hybrid placement policy in that two groups are specified for a portion of the requested virtual machines, and a best fit policy can be applied to the remaining virtual machines.

In some embodiments, topology definitions can be provided in a text format, as shown below in Listing 1:

Listing 1. Example Topology Definition

```
# -----------------------------------------------------------------
    TOPOLOGY = NUM_OF_VMS--
>VM_NO:VM_CPU_COUNT:VM_MEM_REQUIRED:
VM_COMMENTS:VM_OS_TEMPLATE:GROUP_ID
    # -----------------------------------------------------------------
    CRM_DEPLOYMENT =
    13-->
    1:8:32000:RAC_NODE1_HOST:
    OVM_OL5U6_X86_64_11203RAC_PVM:1,
    2:8:32000:RAC_NODE2_HOST:
    OVM_OL5U6_X86_64_11203RAC_PVM:1,
    3:0:0:RAC_NODE1_VIP_HOST:stit_oel5u6:1,
    4:0:0:RAC_NODE2_VIP_HOST:stit_oel5u6:1,
    5:0:0:RAC_CLUSTER_VIP_HOST:stit_oel5u6:1,
    6:4:11264:IDM_HOST:HCM_DVF_REL5_GA_OIM:0,
    7:2:1024:IDM_HOST2:HCM_DVF_REL5_GA_AUTHOHS:0,
    8:4:12288:IDM_HOST3:HCM_DVF_REL5_GA_OID:0,
    9:2:3072:OHS_HOST:HCM_DVF_REL5_GA_OHS:0,
    10:4:15360:FA_ADMIN_HOST:
    HCM_DVF_REL5_GA_FA:0,
    11:4:20480:FA_PRIMARY_HOST:
    HCM_DVF_REL5_GA_PRIMARY:0,
    12:24:50176:FA_SECONDARY_HOST:
    HCM_DVF_REL5_GA_SECONDARY:0,
    13:4:6144:BI_HOST:HCM_DVF_REL5_GA_BI:0
```

As shown in Listing 1, thirteen virtual machines in two groups are requested. In some embodiments, groups can be identified based on names of VMs without explicit group IDs. Listing 1 defines an example topology for a user relations manager (CRM) deployment. Each VM in the topology definition includes a VM number (VM_NO), a defined number of CPUs (VM_CPU_COUNT), a defined amount of memory (VM_MEM_REQUIRED), a VM name (VM_COMMENTS), and operating system definition (VM_OS_TEMPLATE), and a group ID (GROUP_ID). In some embodiments, the topology definition may include more or fewer requirements. For example, in some embodiments the topology definition for each VM may include a flag that indicates whether a proxy node is be used. Some VMs, such as VMS 3-5, may be requested without a CPU or memory requirement, these VMs may be set up as IP addresses for the deployment.

As shown above, groups can be identified automatically based on the topology definition and/or defined explicitly in the topology definition. For example, in Listing 1, each virtual machine named "RAC_*" can be identified and grouped automatically. In some embodiments, recommended groups can be identified based on the node names and presented to a user for confirmation. In some embodiments, an explicit group ID can be included in the topology definition. For example, as shown in Listing 1, VMs 1-5 include a Group_ID of 1, while VMs 6-13 include a Group_ID of 0. In some embodiments, if the Group_ID corresponds to a pre-existing group, the newly requested VMs can be added to the pre-existing group.

As shown in FIG. 3, in the context of IaaS, the requested resources within the order or service subscription can be allocated from resource pool 225 based on the topology definition 215. In some embodiments, resource pool 225 may be a hypervisor pool managed by an IaaS provider. In some embodiments, resource pool 225 may include a plurality of resource pools that are distributed across multiple remote data centers.

Figure 4:
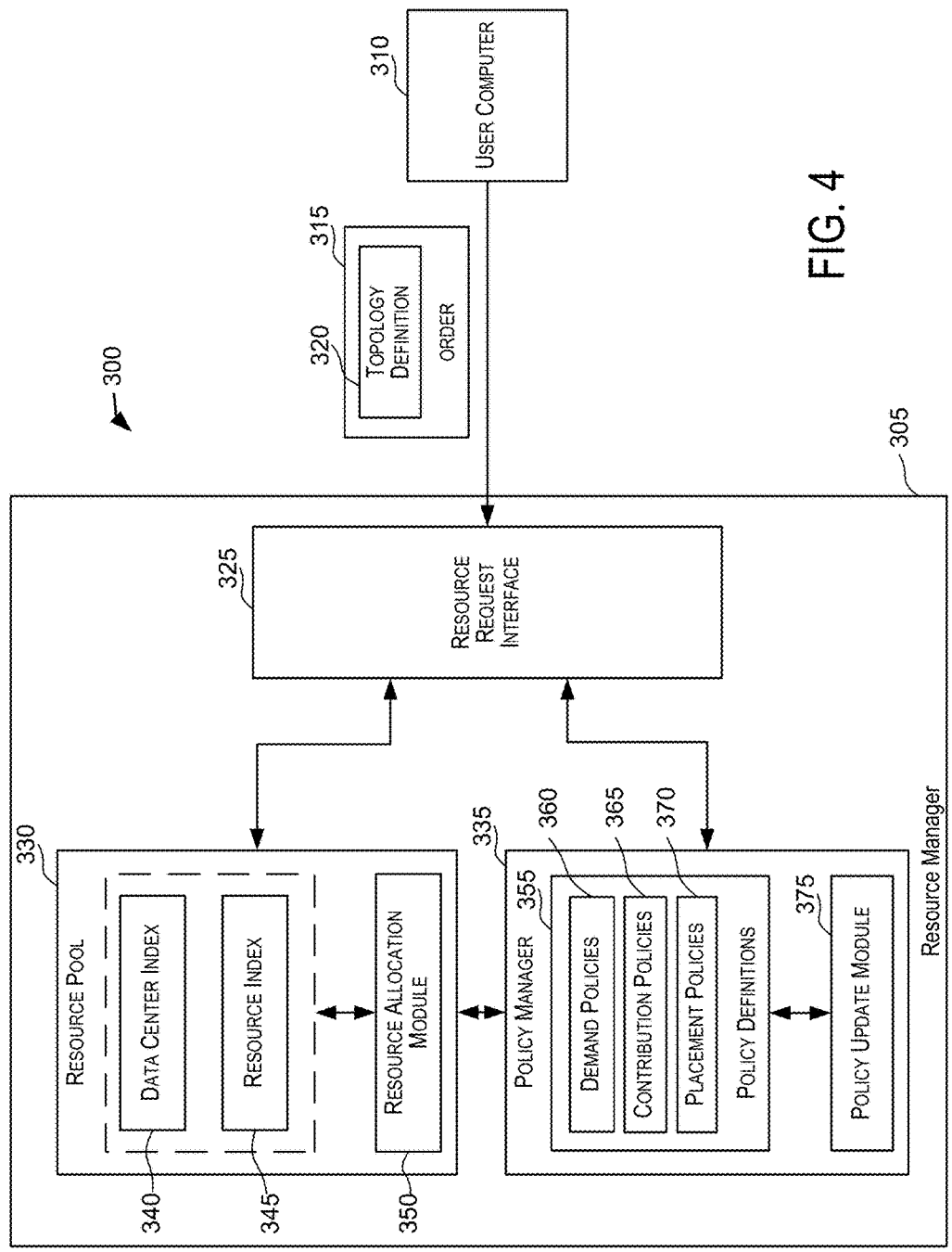
FIG. 4 depicts a more detailed high level diagram of a client device and resource manager according to an embodiment of the present invention.

FIG. 4 depicts a more detailed high level diagram 300 of a client device and resource manager according to an embodiment of the present invention. As shown in FIG. 4, an end user can communicate with a resource manager 305 (e.g., a resource management system 105 as described above with respect to FIG. 2) using user computer 310 to send an order or service subscription 315 that includes a resource request and topology definition 320. The order or service subscription 315 may be received by resource request interface 325 and forwarded to resource pool 330 and policy manager 335. Resource pool 330 can serve as an interface to one or more resource pools (e.g., resource pool 225 described with respect to FIG. 3) at one or more data centers managed by resource manager 305. Resource pool 330 can maintain a data center index 340 and resource index 345. Each index 340 and 345 may indicate the configurable computing resources that are currently available at a particular data center and/or the configurable computing resources that can be provided by each data center. For example, data center index 340 may indicate how many hypervisors are available in each connected data center and whether those hypervisors can be shared and/or used for dedicated placement policies. Similarly, resource index 345 may indicate what pre-existing configurable computing resources are available at any given data center, such as current available application servers, Real Application Clusters (RAC) nodes, storage nodes, etc. Resource allocation module 350 can receive the order or service subscription 315 and can determine the configurable computing resources that are requested and according to what, if any, placement policy. Resource allocation module 350 can communicate with policy manager 335 to identify and determine the requirements of specified placement policies. Policy manager 335 can maintain a plurality of policy definitions 355 including demand policies 360, contribution policies 365, and placement policies 370. Policy manager 335 may also include a policy update module 375, which can update policy definitions 355 as needed.

Figure 5:
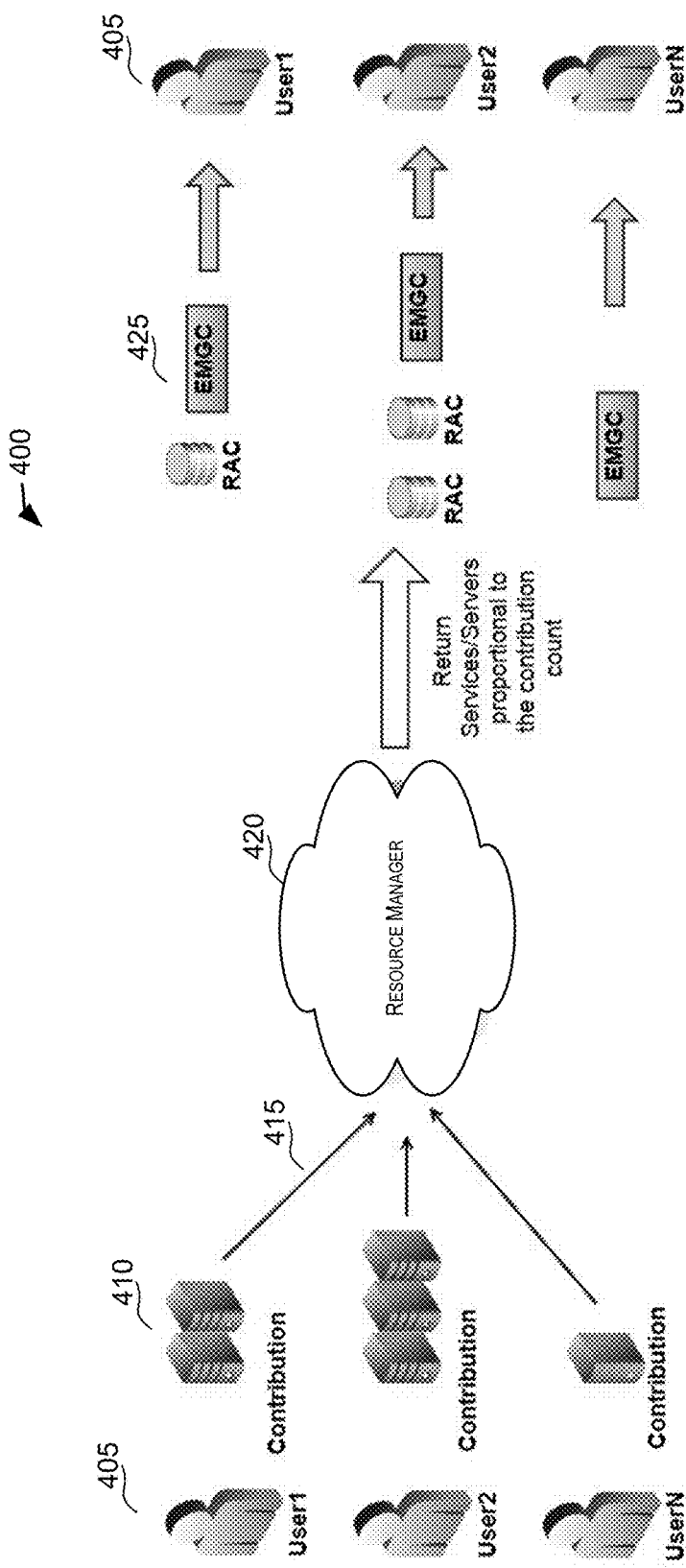
FIG. 5 depicts a simplified diagram of a contribution policy-based resource allocation and management system according to an embodiment of the present invention.

FIG. 5 depicts a simplified diagram of a contribution policy-based resource allocation and management system according to an embodiment of the present invention. In some embodiments, users may contribute unused or extra configurable computing resources in exchange for different configurable computing resources, discounts on order or service subscriptions, or other forms of compensation. For example, a service provider such as a private cloud infrastructure provider may service orders or service subscriptions from a plurality of different users and/or organizations from a shared pool of configurable computing resources. Each user or organization (e.g., a customer) may own or control their own hardware and/or software resources, for example, hypervisors, storage nodes, or other configurable computing resources which may not be fully utilized, or may no longer be used. The embodiment shown in FIG. 5 allows these users and/or organizations to contribute their unused configurable computing resources in exchange for payment and/or for other configurable computing resources that will be used by the contributing user. For example, in the context of IaaS, a user may have an extra storage node that the user does not need. In exchange for contributing their extra storage node, the user may be able to request a RAC node. Users may also contribute hypervisors, software, networks, PODs, or other configurable computing resources.

As shown in FIG. 5, each user 405 can be associated with a contributable resource 410. In some embodiments, the contributable resource 410 is managed by the user and can be hardware and/or software types of resources, for example, networks, network bandwidth, servers, PODs, processing, memory, storage, applications, virtual machines, services, etc., which may not be fully utilized, or may no longer be used. Each user 405 can send a resource submission 415 to a resource manager 420 (e.g., a resource management system 105 as described above with respect to FIG. 1) that includes a description of the resource being contributed. For example, the description may include the type of resource being contributed (e.g., a server) and the specifics of the resource such as name of the resource, memory, CPU information, operating system, additional hardware and/or software, etc. The resource manager 420 can evaluate the contributable resource 410 in view of current resource availability and/or resource demand and return an exchange offer that defines one or more types of requestable resource 425 that a user 405 may receive in exchange for the contributable resource 410. In some embodiments, the requestable resource 425 is managed by the resource manager 420 and can be hardware and/or software types of resources, for example, networks, network bandwidth, servers, PODs, processing, memory, storage, applications, virtual machines, services, etc., which are available for servicing the user. If the exchange (e.g., the contributable resource 410 for the requestable resource 425) meets the needs of the contributing user 405, the user 405 can accept the offer and turn over control of the contributable resource 410 to the resource manager 420. For example, the user 405 can provide the resource manager 420 with access credentials (e.g., a username and password) that provides access to and control over the contributable resource 410. The user 405 can then receive the bargained for requestable resource 425 from the resource manager 406.

This is advantageous for users who can exchange one type of configurable computing resource that the user does not need, for a different type of configurable computing resource that the user does need. In some embodiments, the configurable computing resource (e.g., the requestable resource) that the user receives in exchange may be running on any hypervisor in the resource pool, without requiring the user to set up the desired configurable computing resource. For example, a user may purchase a compute node, but may not have any particular expertise in setting up configurable computing resources on that compute node. By contributing the compute node, the user can receive the desired configurable computing resources in exchange, running on a different compute node without requiring any setup by the user. This may also be used internally by organizations. Organizations, such as large software development companies, may allocate configurable computing resources to different subgroups of the organization based on expected need. When subgroup needs change, due to taking on new projects or changes in demand in the marketplace, it may be difficult for the organization to reallocate configurable computing resources among the subgroups. Using a contribution policy-based resource management and allocation system, the subgroups can rebalance resources spontaneously, without requiring reallocation by the organization. Contribution policies can define "exchange rates" (e.g., a mapping between a contributable resources and requestable resources) for resource contributions based on demand and can be updated dynamically. Similarly, such a contribution policy-based system may be used across organizations. The resource manager can act as a trusted party that provides a standardized protocol for organizations to contribute their computing resources. This may be used in combination with the placement policy-based system described above to ensure that sensitive information from one organization is not exposed to a rival organization's computing resources.

Figure 6:
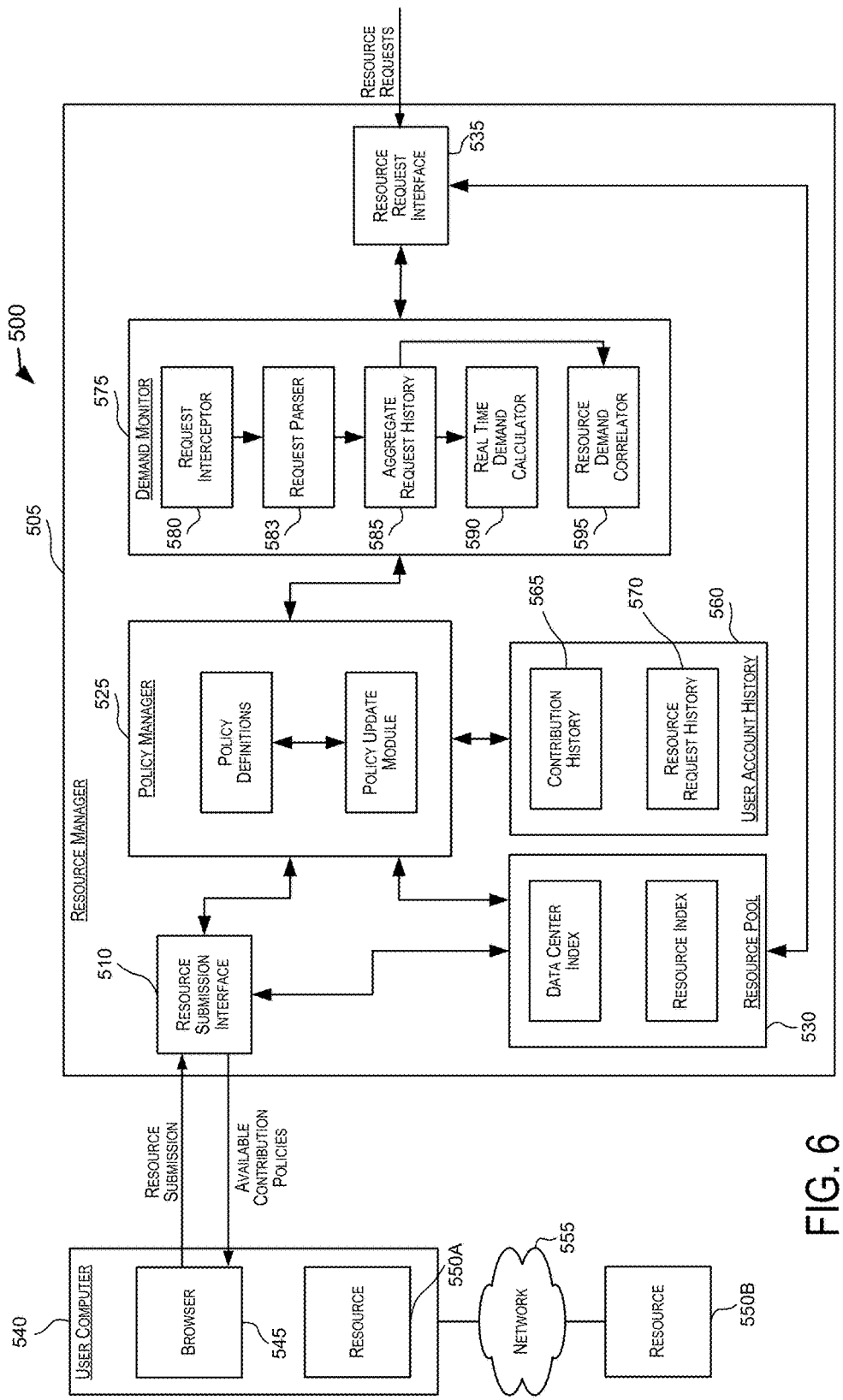
FIG. 6 depicts a more detailed high level diagram of a client device and resource manager according to an embodiment of the present invention.

FIG. 6 depicts a more detailed high level diagram 500 of a client device and resource manager according to an embodiment of the present invention. As shown in FIG. 6, resource manager 505 (e.g., a resource management system 105 or resource manager 305; 420 as described above with respect to FIGS. 2, 4, and 5 receptively) comprises several subsystems or modules including a resource submission interface 510, user account history 515 and demand monitor 520. Additionally, resource manager 505 may include policy manager 525, resource pool 530, and resource request interface 535 (e.g., policy manager 335, resource pool 330, and resource request interface 325 as described above with respect to FIG. 3). These subsystems may be implemented in software (e.g., program code, instructions executable by one or more processors), in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

As depicted in FIG. 6, user computer 540 may execute a web application such as browser 545 that enables a user of user computer 540 to send a resource submission to resource manager 505 to contribute a configurable computing resource (e.g., a contributable resource) to the resource manager 505. The resource submission can specify the type of resource being contributed (e.g., networks, network bandwidth, servers, PODs, processing, memory, storage, applications, virtual machines, services, etc.) and the specifics of the resource such as name of the resource, memory, CPU information, operating system, additional hardware and/or software, etc. The contributable resource is owned or otherwise controlled (e.g., managed) by the user (e.g., a resource the user is no longer wholly or partially using), such as local resource 550A and/or remote resource 550B, which the user may access through network 555.

In one embodiment, resource submission interface 510 can receive the resource submission and communicate with policy manager 525 to identify one or more contribution policies that may apply to the resource submission. For example, each contribution policy may specify one or more types of requestable resources (e.g., networks, network bandwidth, servers, PODs, processing, memory, storage, applications, virtual machines, services, etc.) that may be provided in exchange for the type of resource being contributed. Once the applicable contribution policies have been identified, the policy manager 525 can return the one or more types of requestable resources identified for the resource submission. Accordingly, each contribution policy effectively represents an offer of one or more types of requestable resources, which the user can accept or reject in exchange for the contributable resource. If the user selects or accepts one of the one or more types of requestable resource, a user account history 560 can be updated to indicate resource being contributed by the user in contribution history 565. Thereafter, the user can submit an order or service subscription that includes a resource request for a requestable resource of the type previously selected or accepted, and the resource manager 505 can respond with an allocation of the requestable resource. Additionally, when the user submits the order or service subscription, resource request history 570 can similarly be updated with the request for the resource. Tracking the user's contribution and order or service subscription histories enables the resource manager 505 to track whether the user has received the agreed upon requestable resource in exchange for the contributable resource.

In some embodiments, the contribution policies may be tailored for a particular user based on their contribution history. For example, users with a history of contributing many configurable computing resources may receive more favorable offers (e.g., more configurable computing resources in exchange for a contribution than would otherwise be provided based on current demand) than users with a limited contribution history.

In an alternative embodiment, resource submission interface 510 can receive an order or service subscription, which includes an offer to contribute one or more types of resources in exchange for one or more requestable resources, and communicates with policy manager 525 to determine whether the offer may be satisfied. For example, the order or service subscription may define one or more resources that may be contributed in exchange for one or more requestable resources preferred by the user. Additionally, the order or service subscription may define one or more users and/or one or more geographic regions from which the one or more requestable resources may be provided. Accordingly, each order or service subscription effectively represents an offer of exchange of one or more types of contributable resources for one or more types of requestable resources that the policy manager 525 can accept, reject, or counter (e.g., propose one or more other types of configurable computing resource based on contribution policies maintained by the policy manager 525). If the policy manager 525 accepts the offer, the user account history 560 can be updated to indicate the contribution of the one or more resources by the user in contribution history 565. Additionally, the resource request history 570 can similarly be updated with the one or more resources requested by the user. The acceptance of the offer can be determined by the policy manager 525 based on a number of factors including but not limited to permissions granted from the one or more users from which the contributable or requestable resources may be provided, availability and/or demand of the types of contributable or requestable resources, equality of the exchange between the types of the contributable resources and the types of the requestable resources, the contribution policies maintained by policy manager 525, etc. In such embodiments, it is possible for a first user "A" to collaborate with a second user "B" on projects or jobs and share one or more resources with one another to complete each user's portion of the project or job, and/or enter into an agreement for the exchange of one or more resources between one another.

In some embodiments, the resource policies (e.g., contribution policies) maintained by policy manager 525 can be dynamically updated based on the current demand for different types of contributable and/or requestable resources. Demand monitor 575 can intercept or receive orders or service subscriptions using request interceptor 580 as they are forwarded from resource request interface 535 to policy manager 525. In some embodiments, demand monitor 575 may receive orders or service subscriptions in a batch at the end of a reporting period (e.g., daily or hourly) from the policy manager 525, without intercepting or receiving each order or service subscription. When demand monitor 575 intercepts or receives an order or service subscription, demand monitor 575 can forward the order or service subscription to policy manager 525 and retain a copy of the order or service subscription. Request parser 583 can analyze the order or service subscription to determine the configurable computing resources that are requested, the entity that requested the resources, and the time the resources were requested. The parsed order or service subscription can then be added to an aggregate request history 585. Aggregate request history 585 can include a data structure that stores a running list of orders or service subscriptions sorted by time, requestor, and by requested resource. Real time demand calculator 590 can analyze the aggregate request history 585 over a particular time period or request volume to determine demand over that time period. Resource demand correlator 595 can also analyze the aggregate request history 585 to determine patterns in orders or service subscriptions. Dynamic resource sets or groups of configurable computing resources can be defined based on order or service subscription patterns such that when a given configurable computing resource is requested, other resources in the dynamic resource set are also provisioned and configured to communicate with the requested resource.

FIGS. 7-10 depict simplified flowcharts depicting processing performed for contribution policy-based and demand policy-based based resource allocation according to embodiments of the present invention. The steps of FIGS. 7-10 may be implemented in the environments of FIGS. 1-6 and 11-15, for example. As noted herein, the flowcharts of FIGS. 7-10 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks show in succession may, in fact, be executed substantially concurrently, or the blocks may sometimes be executed in the reverse order, depending upon the functionality involved. It will also be noted that each block of the block diagrams and/or flowchart illustration, and combination of blocks in the block diagrams and/or flowchart illustration, can be implemented by special purpose hardware-based systems that perform the specified functions or acts, or combinations of special purpose hardware and computer instructions.

Figure 7:
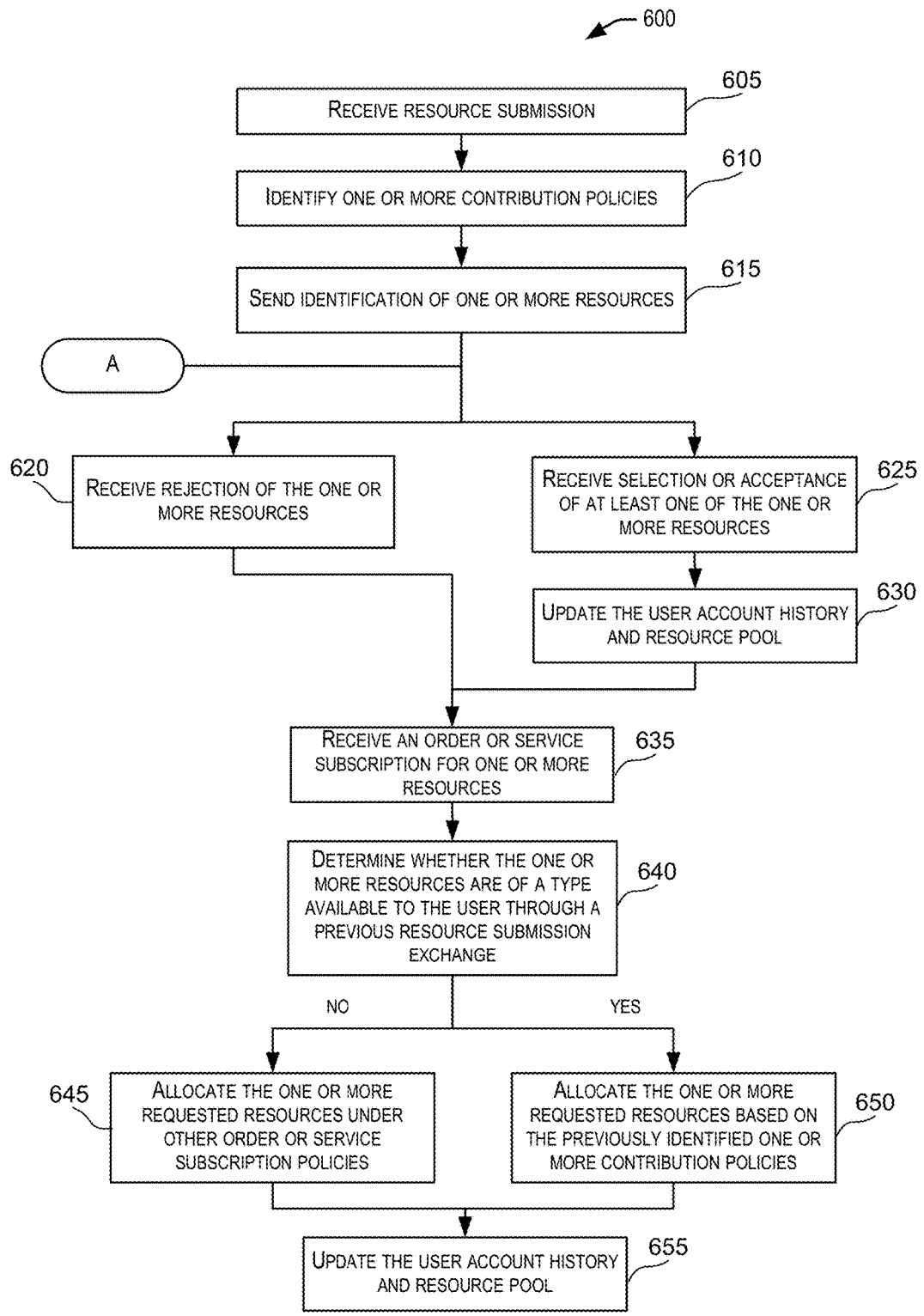
FIG. 7 depicts a simplified flowchart depicting processing performed for contribution policy-based resource allocation according to an embodiment of the present invention.

FIG. 7 depicts a simplified flowchart 600 depicting processing performed for contribution policy-based resource allocation using contribution policies maintained by a policy manager. At step 605, a resource submission can be received that identifies a contributable resource. For example as described above, resource submission interface 510 can receive the resource submission from the user computer 540 and forward the resource submission to the policy manager 525. The resource submission can specify the type of resource being contributed (e.g., networks, network bandwidth, servers, PODs, processing, memory, storage, applications, virtual machines, services, etc.) and the specifics of the resource such as name of the resource, memory, CPU information, operating system, additional hardware and/or software, etc. The contributable resource is owned or otherwise controlled (e.g., managed) by the user (e.g., a resource the user is no longer wholly or partially using), such as local resource 550A and/or remote resource 550B.

At step 610, one or more contribution policies that may apply to the resource submission can be identified. For example, each contribution policy may specify one or more resource types of requestable resources (e.g., networks, network bandwidth, servers, PODs, processing, memory, storage, applications, virtual machines, services, etc.) that may be provided in exchange for the type of resource being contributed. The identification of the one or more contribution policies can comprise determining the resource type of the contributable resource based on the resource submission, and determining that the resource type matches one or more resource types of contributable resources (within the one or more contribution policies), the one or more resource types of contributable resources mapping to the one or more resource types of requestable resources in the one or more contribution policies. Accordingly, each contribution policy effectively represents an offer of one or more types of requestable resources, which the user can accept or reject in exchange for the contributable resource. Once the applicable contribution policies have been identified, the policy manager 525 can return the one or more types of requestable resources identified for the resource submission. In some embodiments, the identification of the one or more contribution policies can be further developed using contribution policies that are more narrowly tailored or defined based on any number of factors including the one or more type of requestable resource being available for use by the user, a demand level of the one or more types of contributable and/or requestable resources, and a user's history of resource contribution, e.g., users with a history of contributing many resources may receive more favorable contribution policies or offers (e.g., more resources in exchange for a contribution than would otherwise be provided based on current demand) than users with a limited contribution history.

At step 615, identification of the one or more resource types of requestable resources that may be provided in exchange for the type of resource being contributed can be sent to the user based on the identified one or more contribution policies. For example, resource submission interface 510 can send the identification of the one or more resource types of the requestable resources from the policy manager 525 to the user computer 540 based on the identified one or more contribution policies. At step 620, upon rejection of at least one type of the requestable resources by the user, the rejection can be received. For example, as described above, resource submission interface 510 can receive the rejection of at least one type of the requestable resources from the user computer 540. At step 625, upon selection or acceptance of at least one type of the requestable resources by the user, information indicating a selection or acceptance of the at least one type of the requestable resources can be received. For example, as described above, resource submission interface 510 can receive information indicating a selection or acceptance of at least one type of the requestable resources from the user computer 540. In some embodiments, the information can also include access credentials (e.g., a username and password) that provide access to and control over the contributable resource identified in the resource submission.

At step 630, the user account history and resource pool can be updated to indicate changes implemented from the selection or acceptance of the at least one type of the requestable resources. For example, the user account history 560 can be updated to indicate the contributable resource provided in exchange for the at least one type of the requestable resources in the contribution history 565. Additionally, the data center index and/or resource index within the resource pool 530 can be updated to indicate the availability of the contributable resource for servicing one or more users of the resource manager (e.g., a distributed system managed by an service provider).

At step 635, an order or service subscription can be received from the user for a requestable resource. For example, resource submission interface 510 can receive the order or service subscription from the user computer 540 and forward the order or service subscription to the resource manager 505. At step 640, a determination can be made as to whether the requestable resource is of the type available to the user though the previous resource submission exchange (i.e., a requestable resource of the type previously selected or accepted in exchange for the contributable resource). For example, the resource manager 505 can check the user account history 560 to determine whether the requestable resource is of the type promised in exchange for the contributable resource. At step 645, when the requestable resource is not of the type promised in exchange for the contributable resource, the requestable resource can be allocated to the user in accordance with other order or service subscription policies such as the placement or demand policy-based system(s) described herein and/or traditional order or service subscription policies.

At step 650, when the requestable resource is of the type promised in exchange for the contributable resource, the requestable resource can be allocated to the user based on the previously identified one or more contribution policies. For example, when the requestable resource is of the type promised in exchange for the contributable resource, the resource manager 505 can allocate and configure the requestable resource from the resource pool 530 for servicing the user or consumer, and send a confirmation message to the user or consumer that the requestable resource has been allocated. The requestable resource may be any configurable computing resource of the type selected or accepted by the user. For example, if the type of requestable resource selected was a RAC node, then a request for a RAC one node, which normally runs only one instance against a shared set of data files, can be allocated and configured for servicing the user or consumer.

In some embodiments, the resource pool 530 from which the requested resource is allocated may be a hypervisor pool managed by an IaaS provider. In some embodiments, resource pool 530 may include a plurality of resource pools that are distributed across multiple remote data centers. As should be understood, the allocation and configuration of the requested resource can be further defined based on topology definitions and the placement policies, as discussed in detail above with respect to FIGS. 3 and 4.

At step 655, the user account history and resource pool can be updated to indicate changes implemented from the order or service subscription for the requestable resource. For example, the user account history 560 can be updated to indicate the requestable resource has been allocated to the user in the resource request history 570. Tracking the user's contribution and order or service subscription histories enables the resource manager 505 to track whether the user has received the agreed upon requestable resource in exchange for the contributable resource. Additionally, the data center index and/or resource index within the resource pool 530 can be updated to indicate the allocation of the requestable resource for servicing the user.

Figure 8:
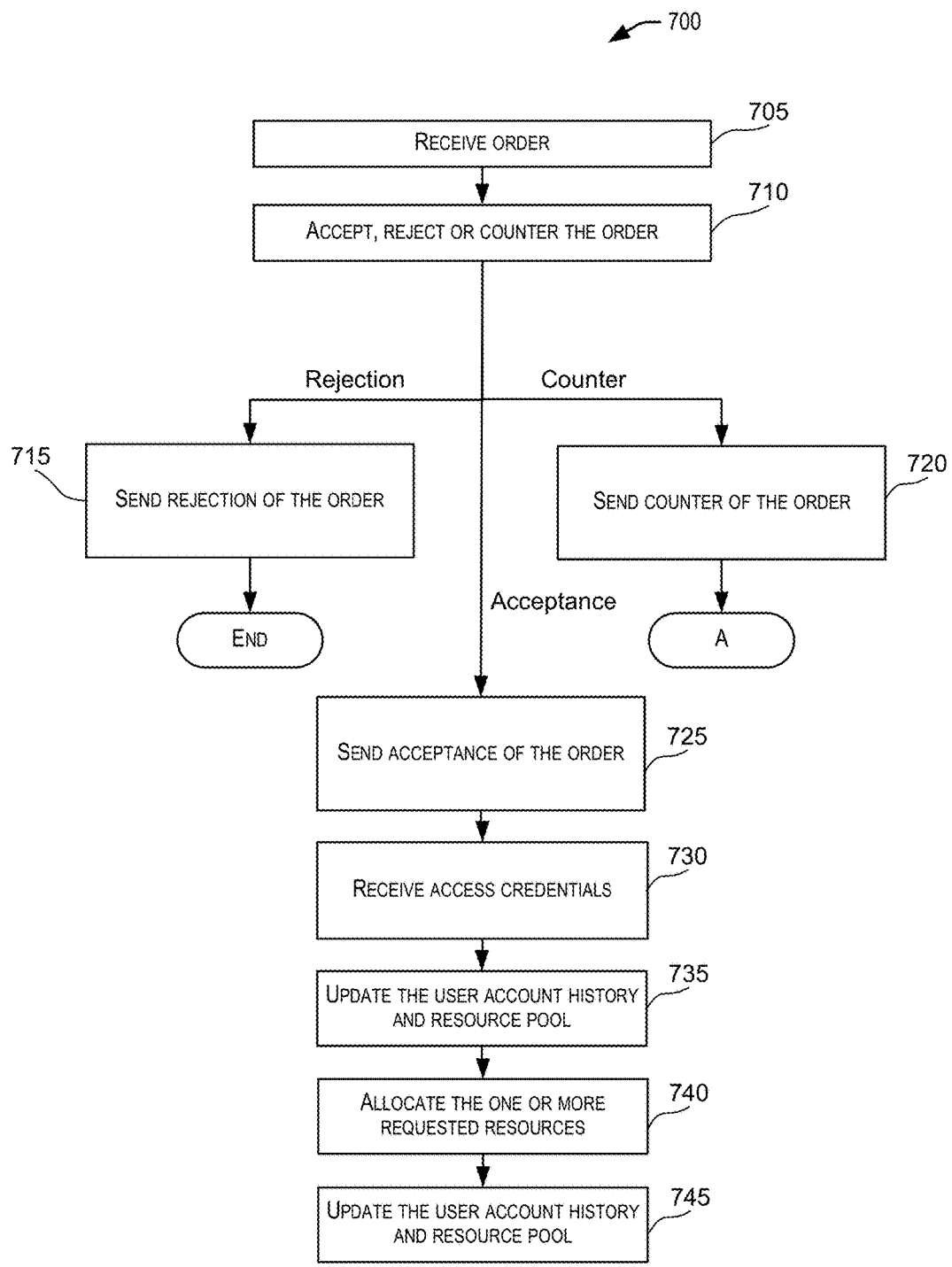
FIG. 8 depicts another simplified flowchart depicting processing performed for contribution policy-based resource allocation according to an embodiment of the present invention.

FIG. 8 depicts a simplified flowchart 700 depicting processing performed for contribution policy-based resource allocation using an order or service subscription provided by a user. At step 705, an order or service subscription, which includes an offer to contribute one or more resources in exchange for one or more requestable resources, can be received. For example, as described above, resource submission interface 510 can receive the order or service subscription from the user computer 540 and forward the order or service subscription to the policy manager 525. The order or service subscription can specify one or more resources owned or otherwise controlled by the user, such as local resource 550A and/or remote resource 550B, which the user intends to contribute to a pool of resources managed by resource manager 505. Additionally, the resource submission can specify one or more requestable resources preferred for use by the user. In some embodiments, the order or service subscription may also identify one or more users that the one or more contributable resources are intended to service, one or more users from which the one or more requestable resources may be provided (the default may be the resource pool), and/or one or more geographic regions from which the one or more requestable resources may be provided.

At step 710, the offer can be accepted, rejected, or countered. For example, the order or service subscription effectively represents an offer of exchange of one or more types of contributable resources for one or more types of requestable resources that the policy manager 525 can accept, reject, or counter (e.g., a counter offer of one or more other types of requestable resources based on contribution policies maintained by the policy manager 525 in a process similar to that described with respect to steps 605 and 610 of FIG. 7). The acceptance, rejection, or counter of the order or service subscription can be determined by the policy manager 525 based on any number of factors including but not limited to permissions granted from one or more users from which the contributable and/or requestable resources may be provided, availability and/or demand of the contributable and/or requestable resources, equality of the exchange between the types of the contributable resources and the types of the requestable resources, the contribution policies maintained by policy manager 525, etc.

At step 715, upon rejection of the offer, the rejection of the order or service subscription can be sent to the user and the process ends. At step 720, upon a counter offer of the offer, one or more other types of requestable resources identified as at least partially satisfying the order or service subscription based on one or more contribution policies can be sent to the user. For example, resource submission interface 510 can send one or more other types of requestable resources from the policy manager 525 to the user computer 540 in a process similar to that described with respect to steps 610 and 615 of FIG. 7. Thereafter, the process can continue in a similar manner as described with respect to steps 620-655 of FIG. 7.

At step 725, upon acceptance of the offer, the acceptance of the order or service subscription can be sent to the user. For example as described above, resource submission interface 510 can receive the acceptance of the offer from the policy manager 525 and forward the acceptance to the user computer 540. At step 730, access credentials (e.g., a username and password) can be received that provide access to and control over the one or more resources being contributed. For example, resource submission interface 510 can receive the access credentials from the user computer 540 and forward the access credentials to the resource manager 505. At step 735, the user account history and resource pool can be updated to indicate changes implemented from the acceptance of the offer. For example, the user account history 560 can be updated to indicate the one or more resources contributed by the user in exchange for the one or more requestable resources in the contribution history 565.

Additionally, the data center index and/or resource index within the resource pool 530 can be updated to indicate the availability of the one or more resources contributed for servicing one or more users of the resource manager (e.g., a distributed system managed by an service provider).

At step 740, the one or more requested resources identified in the order or service subscription can be allocated. For example, the resource manager 505 can allocate the one or more requested resources from the resource pool 530 for servicing the user, and send a confirmation message that the one or more requested resources has been allocated. In some embodiments, resource pool 530 may be a hypervisor pool managed by an IaaS provider. In some embodiments, resource pool 530 may include a plurality of resource pools that are distributed across multiple remote data centers. As should be understood, the allocation of the one or more requested resources can be further defined based on topology definitions and the placement policies, as discussed in detail above with respect to FIGS. 3 and 4.

At step 745, the user account history and resource pool can be updated to indicate changes implemented from the acceptance of the order or service subscription. For example, the user account history 560 can be updated to indicate the one or more requested resources have been allocated to the user in the resource request history 570. Tracking the user's contribution and request histories enables the resource manager 505 to track whether the user has received the agreed upon one or more requested resources in exchange for the one or more contributable resources. Additionally, the data center index and/or resource index within the resource pool 530 can be updated to indicate the allocation of the one or more requested resources for servicing the user.

As described above and shown in FIG. 6, resource manager 505 may include a demand monitor 575 that can track demand for configurable computing resources (e.g., networks, network bandwidth, servers, PODs, processing, memory, storage, applications, virtual machines, services, etc.) and demand for particular sets of configurable computing resources. Such monitoring enables resource manager 505 to anticipate and pre-create complex, wired resource sets/groups based on customizable demand policies. This can be performed automatically, without requiring intervention by an administrator. This reduces setup time and improves the end user's experience by providing the configurable computing resources (i.e., resources) the end user needs in response to their requests with little or no setup time.

In some embodiments, demand policies can be generated based on known dependencies between resources. For example if a first resource cannot be used without also requesting a second resource, then a request for either resource can automatically include the other. Additionally, demand policies can be based on known "trends". For example, if an upgrade or new release of a resource is being pushed to market, the number of old versions of the resource pre-created can be reduced as the number of requests for new versions of the resource are received. For example, a first version of an application may require a first release database, while a second version of the application may require a second release database. As the second version of the application is adopted, the number of requests or jobs from the second version of the application will increase. As this activity increases, a demand policy associated with the application can be updated automatically to indicate an increased demand for the second release database. When this demand policy is applied, setups for the second release of the database are given priority over the first release of the database, gradually increasing the number of available second release databases. In some embodiments, release dates of new versions of various resources can also be used to automatically update how many of each version of a resource are pre-created.

In some embodiments, the real time demand calculated by the demand monitor can be used to pre-create resources that are seeing increased demand. For example, if a particular percentage of resource requests include a certain type of POD, then the demand policy can be updated to automatically pre-create more of that certain type of POD. Additionally, some resources require a particular set of resources to function correctly. For example, an application suite may also require a database and an enterprise manager. These known dependencies can be stored in the demand policy such that when the application suite is requested, the dependent resources are also provisioned and configured to communicate with the application suite. In some embodiments, the set of resources may vary dynamically based on demand. For example, the resource demand correlator 595 may identify additional resources that are regularly requested in addition to the dependent resources (e.g., based on a percentage of resource requests that include the additional resource). In these embodiments, the demand policy can be automatically updated to include these additional resources. By monitoring the demand for groups of resources that are used together the demand policy can pre-create the sets of resources instead of individual resources, reducing the time required to set up resources when requested by a user.

In some embodiments, the lifecycles of existing resources can be similarly managed based on current demand and resource usage. When a resource is no longer used, the resource is typically cleaned by the resource manager and returned to the resource pool. Determining when a resource is no longer used can be based on usage (e.g., how frequently the resource is used) or health (e.g., can other resources connect to the resource, is the resource full, etc.). Lack of usage, or failure, can trigger cleanup or maintenance actions on the resource. However, this added cleanup step for resources that have not been used is unnecessary and, for in demand resources, time consuming. By tracking a particular resource's utilization period/trend, the resource manager can determine whether the resource has ever been used. For example, if a storage node is created, but no data is ever stored or retrieved from it, then the resource manager can determine that the resource has not been used and it can be made available to other users without first cleaning the resource.

Figure 9:
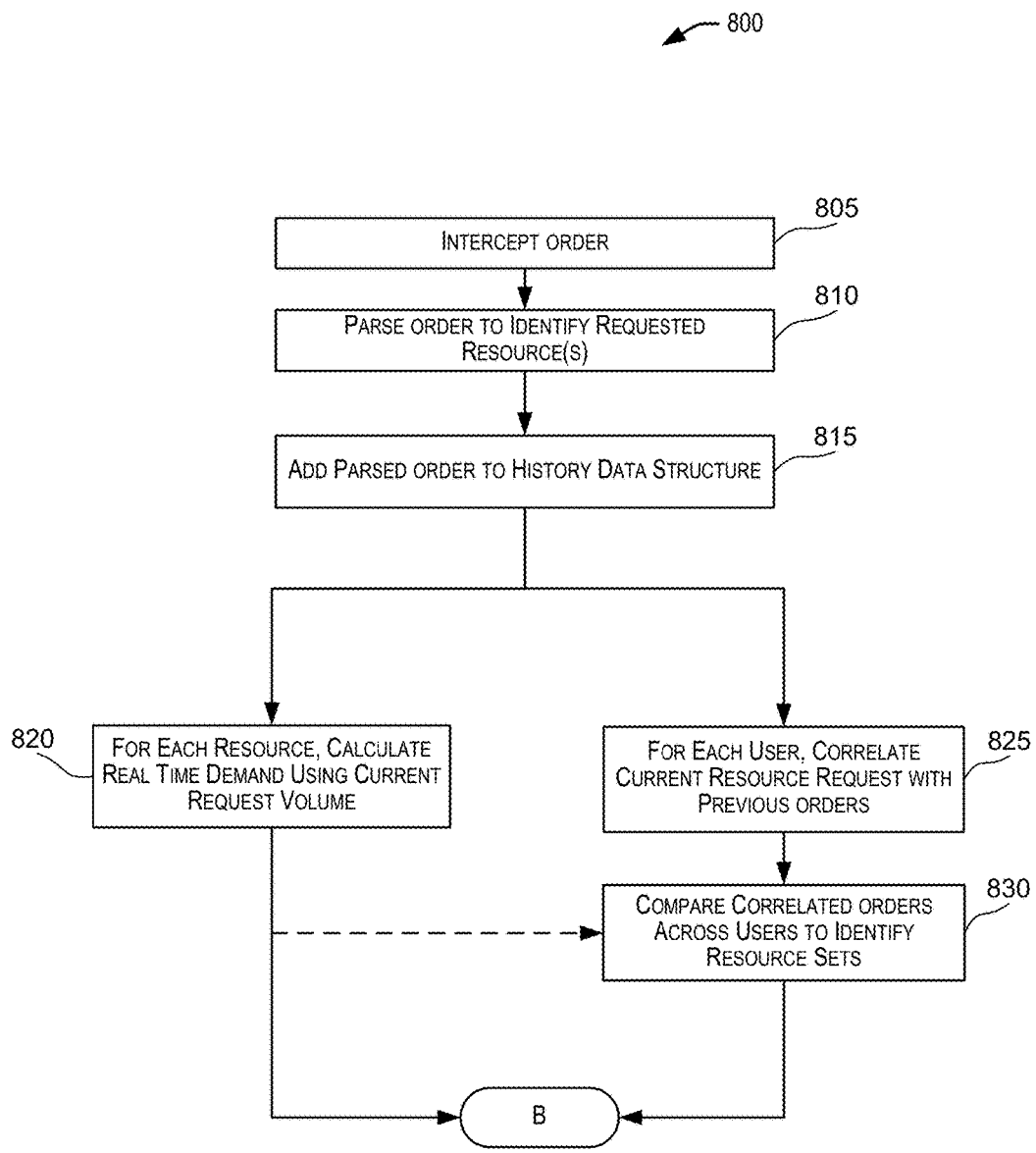
FIG. 9 depicts a simplified flowchart depicting processing performed for demand policy-based resource allocation according to an embodiment of the present invention

FIG. 9 depicts a simplified flowchart 800 depicting processing performed for demand policy-based resource allocation according to an embodiment of the present invention. At step 805, an order or subscription for a service can be intercepted or received. For example as described above with respect to FIG. 6, the demand monitor 575 can intercept or receive the order in real time using request interceptor 580 before passing the order on for further processing at the resource manager 505. In some embodiments, the order can be sent to the demand monitor 575 periodically in a batch for non-real time processing. At step 810, the order can be parsed to identify request data comprising the one or more requested resources, the requestor, and other request data (e.g., request time). For example, the request parser 583 can take the order (i.e., input data) and build a data structure (e.g., a parse tree or other hierarchical structure) that provides a structural representation of the request data (e.g., the one or more requested resources, the requestor, and other request data) within the order, which allows for pattern matching and the extraction of data.

At step 815, the request data can be added to an aggregate history data structure. For example, the data structure that provides a structural representation of the request data from the order can be added to the aggregate history data structure 585, which includes an aggregate of request data for resources within the resource pool. The aggregate history data structure 585 comprises data structures from any number of previously parsed orders or subscriptions for services. Each order can be time stamped as the order is received, and the aggregate history data structure 585 can be sorted by resource, requestor, or other request data. At step 820, for a given resource (e.g., a resource requested in an order or any resource within the resource pool), real-time demand can be calculated for the given resource using a current request volume obtained from the aggregate of request data for the resources within the resource pool. For example, in a particular time period (rolling average, historical time period, etc.) the percentage of orders that include the given resource can be determined using real-time demand calculator 590 and the aggregate history data structure 585. Additionally, a percentage of orders can be correlated to the real-time demand calculated for the given resource relative to other resources within the resource pool using the real time demand calculator 590 and the aggregate history data structure 585.

At step 825, the order received in step 805 can be correlated with at least one other order from the previously parsed orders or subscriptions for services based on at least one component of the request data being the same between the order and the at least one other order. For example, resource demand correlator 595 can determine correlations between two or more orders based on a same user submitting the orders (e.g., for a user who requests an application suite, the user concurrently or subsequently requests a database, and thus, the resource demand correlator 595 could correlate the database with the application suite). The order can be correlated to the at least one other order based on any number of data components obtainable from the aggregate data structure including the requestor or user, a particular time frame in which the resource request was obtained, a type of resource requested, and/or any other data. At step 830, based on the correlated orders, sets of resources can be identified that are commonly requested across users. For example, demand monitor 575 can identify and store known dependencies between resources as a set of resources based on the correlated orders such that when a primary resource (e.g., an application suite) is requested, the dependent resources (e.g., a database) are also provisioned and configured to communicate with the primary resource. In some embodiments, the set of resources may vary dynamically based on the calculated real time demand for resources from step 820. For example, the resource demand correlator 595 may identify additional resources that are regularly requested in addition to the primary and dependent resources (e.g., based on a percentage of orders that include the primary resource, the dependent resources, and the additional resources). In these embodiments, the identified and stored sets of resources can be automatically updated to include these additional resources.

Figure 10:
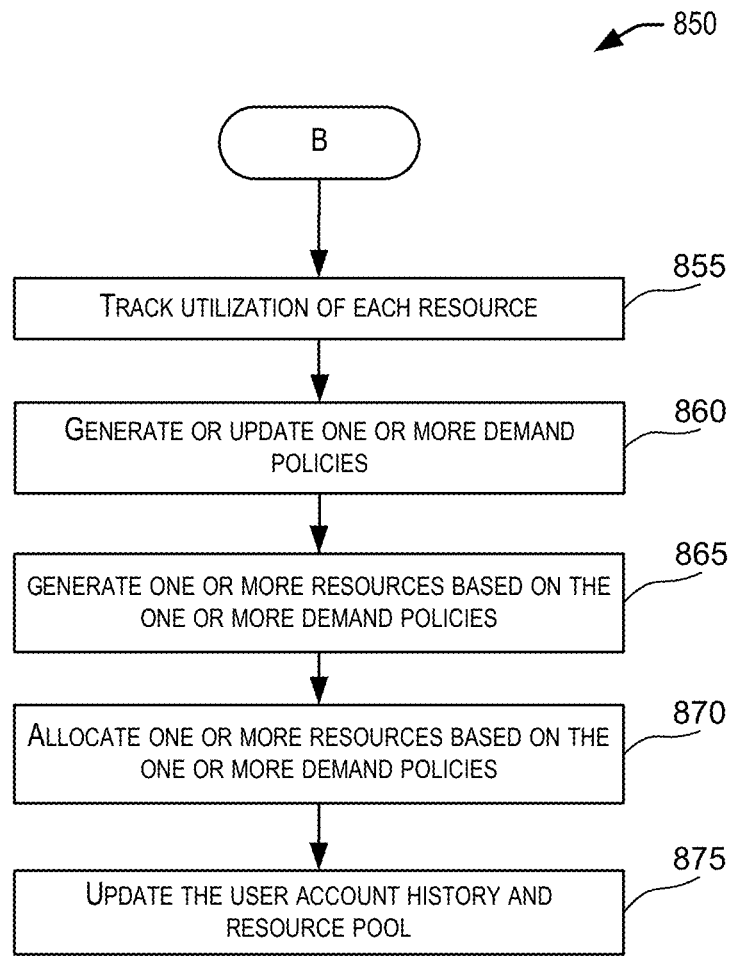
FIG. 10 depicts another simplified flowchart depicting processing performed for demand policy-based resource allocation according to an embodiment of the present invention.

FIG. 10 depicts a simplified flowchart 850 depicting processing performed for demand policy-based resource allocation according to an embodiment of the present invention. At step 855, utilization of each resource within the recourse pool can be tracked. For example, in a particular time period (rolling average, historical time period, etc.), the use of each resource can be determined using resource pool 530, real time demand calculator 590, and the aggregate history data structure 585. By tracking a particular resource's utilization period/trend, the resource manager 505 can determine whether the resource has ever been used, whether the resource has been used recently, the frequency of use of the resource, and/or whether the resource is currently being used.

At step 860, one or more demand policies can be generated or updated based on at least one of: (i) the calculated demand for resources (calculated in step 820 of FIG. 9), (ii) the identified resources and sets of resources (identified in step 830 of FIG. 9), (iii) the identification of additional resources for the sets of resources (optionally identified in step 830 of FIG. 9), and (iv) the tracked utilization of resources (identified in step 855 of FIG. 10). In some embodiments, the real time demand calculated by the demand monitor 575 can be used to generate or update one or more demand policies for resource allocations such that resources can be preemptively created by the resource manager 505 and added to the resource pool. For example, if a particular percentage of resource requests include one or more secondary resources, then the demand policy can be updated to automatically pre-create one or more additional instances of the secondary resource, or if a new application suite is being introduced that requires one or more resources, then the demand policy can be updated to automatically pre-create more instances of the one or more resources.

Additionally in some embodiments, the demand monitor 575 can identify and store known dependencies between resources as a set of resources in one or more demand policies based on the correlated resource requests such that when a primary resource is requested, the dependent resources (e.g., a database) are also provisioned and configured to communicate with the primary resource. For example, an application suite may also require a database and an enterprise manager. These known dependencies can be stored in the demand policy such that when the application suite is requested, the database and enterprise manager are also provisioned and configured to communicate with the application suite. In some embodiments, the identified set of resources may vary dynamically based on the calculated demand for the resources. For example, the resource demand correlator 595 may identify additional resources that are regularly requested in addition to the dependent resources. In these embodiments, the demand policy can be automatically updated to include these additional resources. By monitoring the demand for groups of resources that are used together, the demand policy can be used to preemptively create the sets of resources, configure the resources to communicate with one another, and add the resources to the resource pool, instead of individual resources, reducing the time required to set up resources when requested by a user.

Additionally in some embodiments, demand monitor 575 can identify resources that have never been used, resources that have been used recently, the frequency of use of each resource, and/or whether resources are currently being used, and generate or update one or more demand policies to control allocation of the resources based on such utilization information. For example, if a resource is created, but the resource has never been accessed by a user, then the resource manager 905 can determine that the resource has not been used and the resource can be reallocated based on the one or more demand policies to other users without first cleaning the resource. On the other hand, if a resource is created, but the resource has not been accessed by a user for a predetermined amount of time (e.g., two months), then the resource manager 905 can determine that the resource is no longer in use and the resource can be reallocated based on the one or more demand policies to other users after cleaning the resource.

At step 865, one or more resources can be automatically pre-created (preemptively created), added to the resource pool, removed from the resource pool, and/or cleaned based on the generated or updated one or more demand policies. For example, the resource manager 505 can automatically pre-create the one or more resources and add the pre-created one or more resources to the resource pool for servicing one or more users based on the generated or updated one or more demand policies. In some embodiments, the resource manager 505 can automatically remove the one or more resources from the resource pool based on the generated or updated one or more demand policies. In other embodiments, the resource manager 505 can automatically clean the one or more resources within the resource pool based on the generated or updated one or more demand policies.

At step 870, one or more requested resources associated with the one or more demand policies can be allocated to one or more users. For example, the resource manager 505 can allocate the one or more requested resources from the resource pool for servicing one or more users based on the one or more demand policies, and send a confirmation message that the one or more requested resources has been allocated. In some embodiments, the resource pool may be a hypervisor pool managed by an IaaS provider. In some embodiments, the resource pool may include a plurality of resource pools that are distributed across multiple remote data centers. As should be understood, the allocation of the one or more requested resources can be further defined based on topology definitions, the placement policies, and contribution policies, as discussed in detail above with respect to FIGS. 1-8. At step 875, the user account history and resource pool can be updated to indicate changes implemented from the utilization of the one or more demand policies. For example, the data center index, resource index, and/or user account history 560 can be updated to indicate the one or more requested resources have been pre-created and/or allocated to the one or more users.

Figure 11:
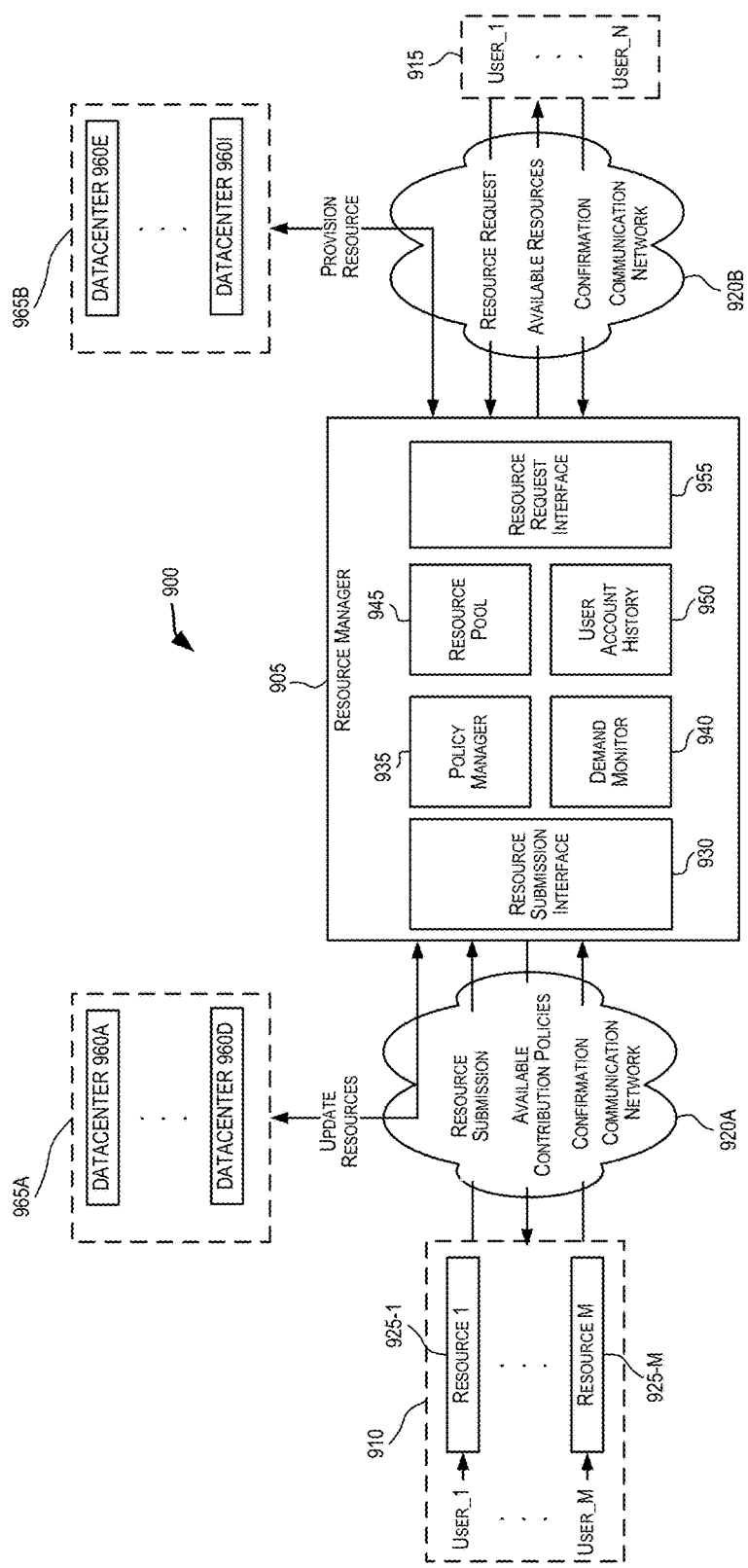
FIG. 11 depicts a simplified high level diagram of a network environment that may incorporate an embodiment of the present invention.

In some embodiments, the above described systems and processes for providing placement policy-based, contribution policy-based, and demand policy-based resource management and allocation may be implemented in a single resource manager. FIG. 11 depicts a simplified high level diagram of a network environment 900 that may incorporate an embodiment of the present invention. As shown in FIG. 11, resource manager 905 (e.g., a resource management system 105 or resource manager 305; 505 as described above with respect to FIGS. 2, 4 and 6, receptively) can manage requests from users 910 and 915. These requests can include resource contribution submissions from users 910, where a user makes one or more resources the user owns, possesses, or otherwise controls, available to the resource manager 905 to be added to the resource pool. The requests may also include resource requests from users 915 for one or more resources from the resource pool. Users 910 and users 915 may include the same users, different users, or any combination thereof. Requests may be received from one or more user (or client) devices at resource manager 905 over a network 920A and/or 920B. In some embodiments, the users 910 may contribute resources in exchange for particular functional guarantees, discounts, or other incentives that may be applied to subsequent or contemporaneous resource requests, as described above.

Users 910 and 915 are communicatively coupled to resource manager 905 via the communication networks 920A and 920B. The embodiment depicted in FIG. 11 is merely an example and is not intended to unduly limit the claimed embodiments of the present invention. One of ordinary skill in the art would recognize many variations, alternatives, and modifications. For example, there may be more or fewer user devices than those shown in FIG. 11. The user devices may be of various different types, including, but not limited to personal computers, desktops, mobile or handheld devices such as a laptop, a mobile phone, a tablet, etc., and other types of devices. Communication networks 920A and 920B facilitates communications between the user devices and resource manager 905. Communication networks 920A and 920B can be of various types and can include one or more communication networks. Examples of communication networks 920A and 920B include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication networks 920A and 920B may include any communication network or infrastructure that facilitates communications between clients and resource manager 905.

Users 910 may each own, possess, or otherwise control one or more computing resources 925-1 to 925-M. For example, a user may have purchased a particular number of computing nodes from another cloud infrastructure provider which the user may control. Similarly, a user may own a network connected hardware cluster that is configured to provide a hypervisor pool which may run one or more virtual machines. As described above the computing resources may include networks, network bandwidth, servers, PODs, processing, memory, storage, applications, virtual machines, services, etc.

In certain embodiments, a user may use a program or application executed by the user's user device to configure a webpage request. An example of such a program is a web browser, which may be used to generate webpage requests and output webpages received in response to the requests. For example, a user may request a webpage by providing a Uniform Resource Locator (URL) corresponding to the webpage to the browser or by taking an action (e.g., clicking on a URL) that invokes a URL corresponding to the webpage. This causes the browser to generate a webpage request that is then communicated to the website hosting the particular webpage. A webpage received in response to the webpage request is then loaded and output to the user by the browser. Examples of browsers include without restriction various versions of Windows Internet Explorer (IE), Apple Safari, Google Chrome, Mozilla Firefox, Opera, and others.

As described above, users 910 may submit a resource submission to resource manager 905, which details the computing resources being contributed by the user. The resource manager 905 may receive the submission through a resource submission interface 930. The users 915 may submit a resource request to resource manager 905, which details the computing resources being requested by the user. The resource manager 905 may receive the request through a resource request interface 955. The resource manager 905 may include a policy manager 935, demand monitor 940, resource pool 945, and user account history 950. Using these modules, as described similarly with respect to FIGS. 4 and 6, resource manager 905 can pre-create resources and sets of resources in anticipation of demand, manage resource contributions and requests, and enable users to specify placement policies for resource requests, as described above with respect to FIGS. 1-10. The resources and sets of resources provided by and to the users 910 and 915 may be located in one or more data centers 960A-960I, which may be located in different geographical regions 965A and 965B.

Figure 12:
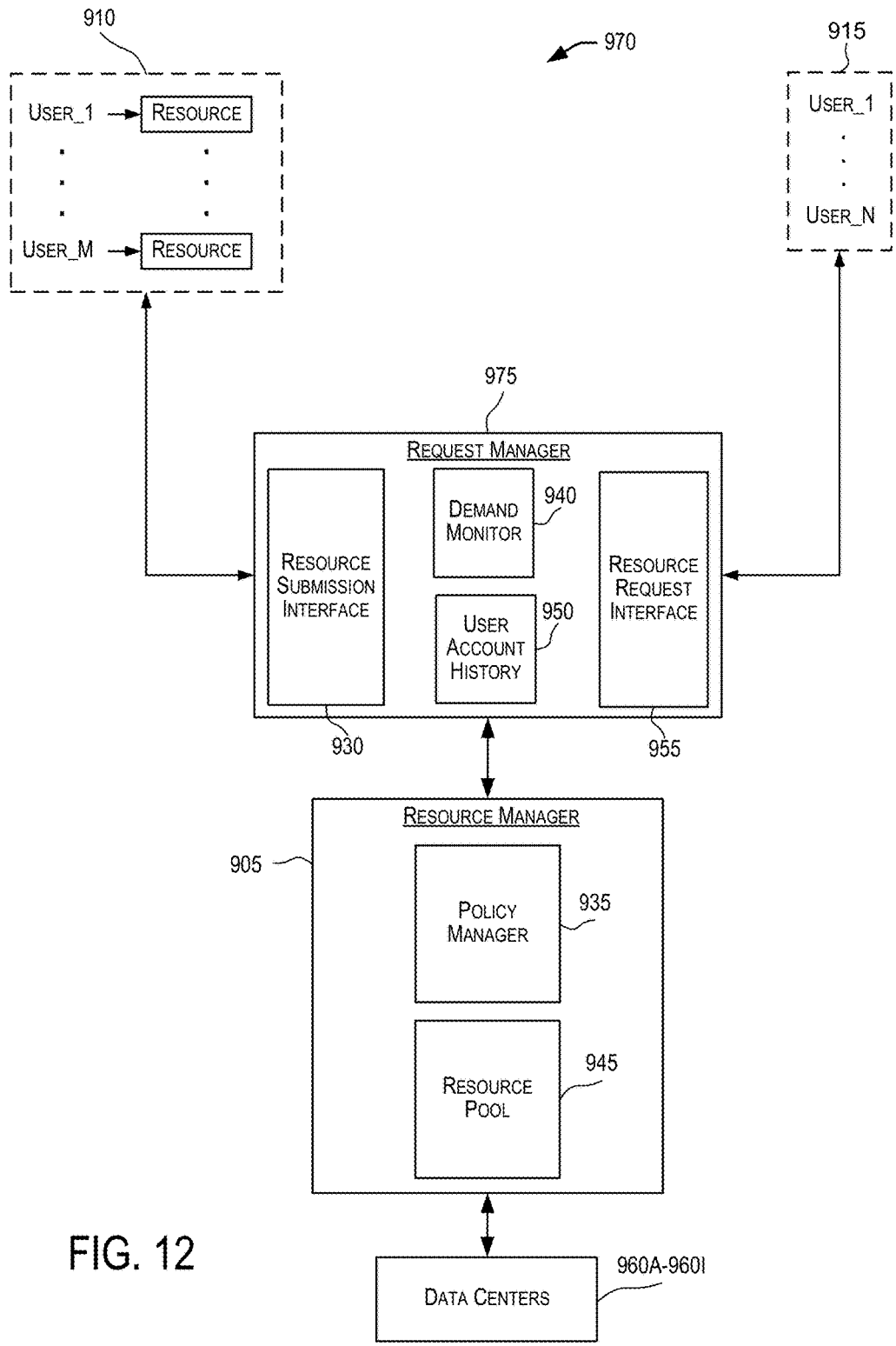
FIG. 12 depicts another embodiment that may incorporate teachings of the present invention.

In the embodiments depicted in FIGS. 1-11, resource manager 905 may serve as a central management platform that receives resource submissions and resource requests from users 910 and 915. FIG. 12 depicts an alternative embodiment 970 that may incorporate teachings of the present invention. Common components in FIG. 11 are referenced using the same reference numbers. As shown in the embodiment depicted in FIG. 12, the resource management functionality and the request management functionality may be separated from each other. A request manager 975 may include resource submission interface 930 and resource request interface 955. The request manager 975 may also include demand monitor 940, which analyzes the requests substantially similarly to the embodiments described above with respect to FIGS. 1-11 and user account history 950. Request manager 975 can communicate resource and/or contribution requests to resource manager 905. Resource manager 905 can include policy manager 935 and resource pool 945. Resource manager 905 can communicate with data centers 960A-960I in accordance with messages received from request manager 975.

Figure 13:
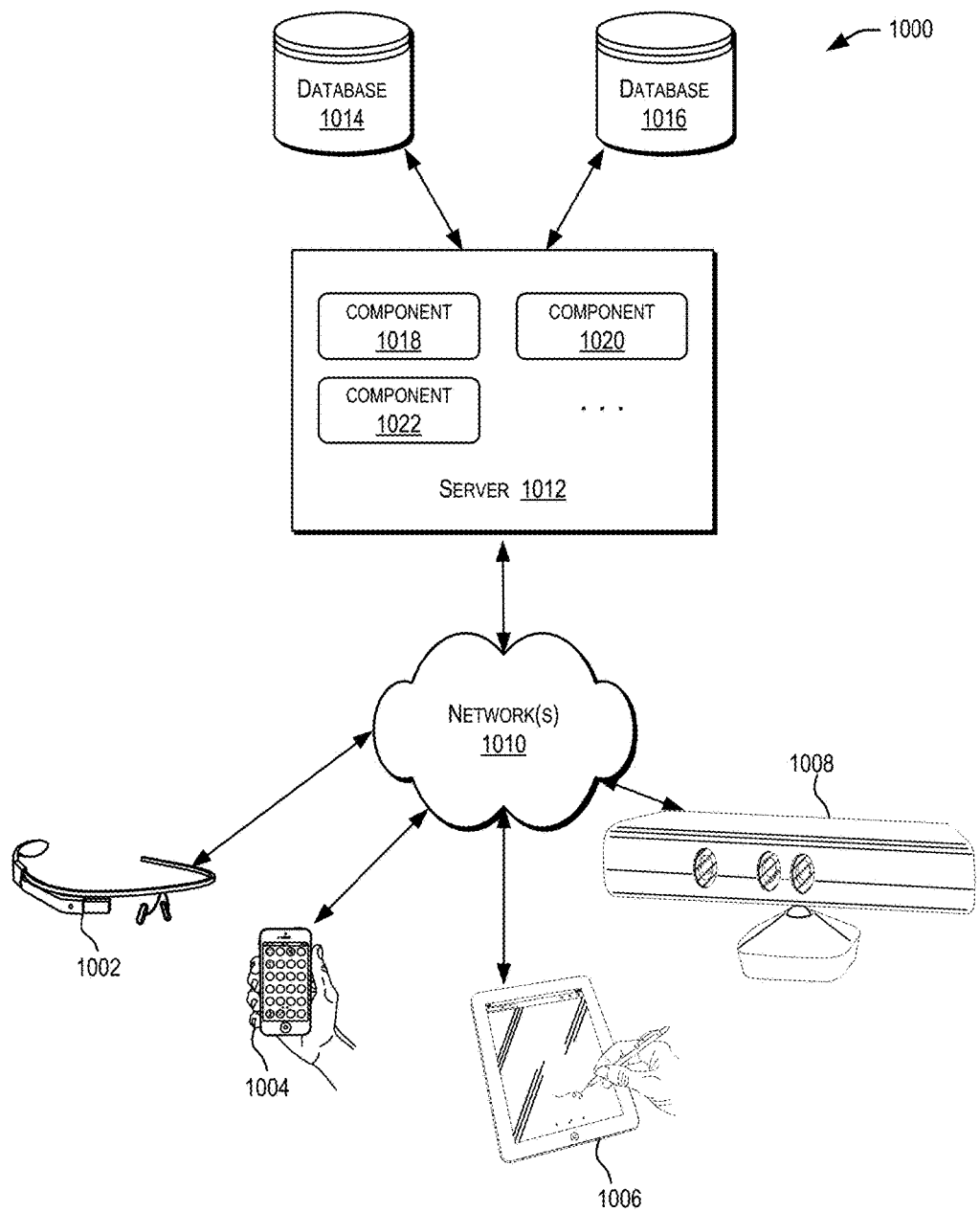
FIG. 13 depicts a simplified diagram of a distributed system for implementing an embodiment.

FIG. 13 depicts a simplified diagram of a distributed system 1000 for implementing an embodiment. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications such as services and applications for placement, contribution, and/or demand policy-based resource allocation. In certain embodiments, server 1012 may also provide other services or software applications can include non-virtual and virtual environments. In some embodiments, these services may be offered as web-based or cloud services or under a SaaS model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 13, software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in FIG. 13 is thus one example of a distributed system for implementing an embodiment system and is not intended to be limiting.

Client computing devices 1002, 1004, 1006, and/or 1008 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1010.

Although distributed system 1000 in FIG. 13 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization. One or more flexible pools of logical storage devices can be virtualized to maintain virtual storage devices for the server. Virtual networks can be controlled by server 1012 using software defined networking In various embodiments, server 1012 may be adapted to run one or more services or software applications described in the foregoing disclosure. For example, server 1012 may correspond to a server for performing processing as described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. These databases may provide a mechanism for storing information such as user request and/or contribution histories, demand policy-based resource correlation information, policy definitions, and other information used by embodiments of the present invention. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 14:
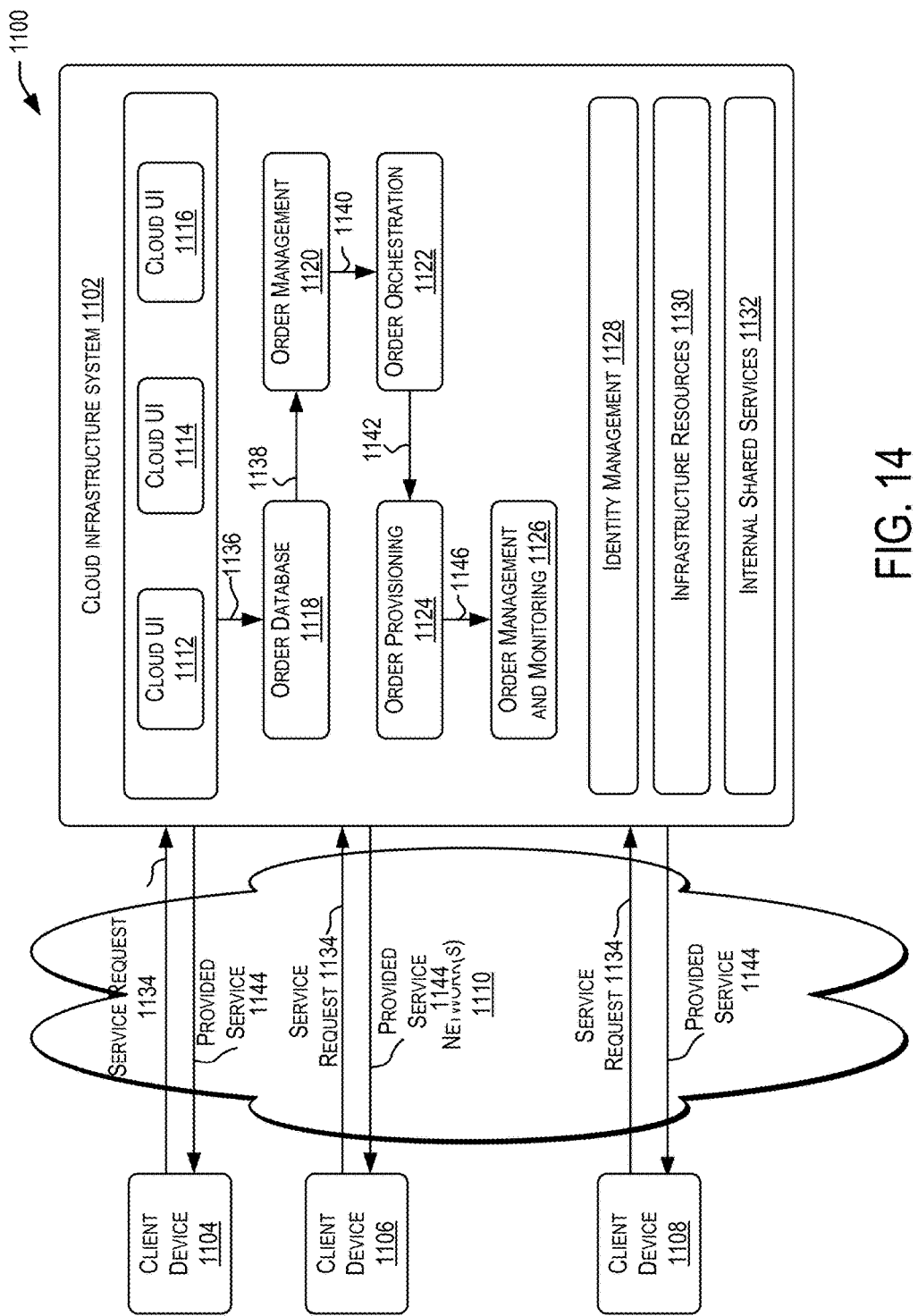
FIG. 14 is a simplified block diagram of one or more components of a system environment in which services may be offered as cloud services, in accordance with an embodiment of the present disclosure.

In some embodiments, a cloud environment may be provide one or more services for placement, contribution, and/or demand policy-based resource allocation. FIG. 14 is a simplified block diagram of one or more components of a system environment 1100 in which services may be offered as cloud services, in accordance with an embodiment of the present disclosure. In the illustrated embodiment in FIG. 14, system environment 1100 includes one or more client computing devices 1104, 1106, and 1108 that may be used by users to interact with a cloud infrastructure system 1102 that provides cloud services, including services for placement, contribution, and/or demand policy-based resource allocation. Cloud infrastructure system 1102 may comprise one or more computers and/or servers that may include those described above for server 1012.

It should be appreciated that cloud infrastructure system 1102 depicted in FIG. 14 may have other components than those depicted. Further, the embodiment shown in FIG. 14 is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for client computing devices 1002, 1004, 1006, and 1008. Client computing devices 1104, 1106, and 1108 may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102. Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between client computing devices 1104, 1106, and 1108 and cloud infrastructure system 1102. Each network may be any type of network familiar to those skilled in the art that can support data communications using any of a variety of commercially-available protocols, including those described above for network(s) 1010.

In certain embodiments, services provided by cloud infrastructure system 1102 may include a host of services that are made available to users of the cloud infrastructure system on demand. In addition to services related to placement, contribution, and/or demand policy-based resource allocation, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1102 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the user's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a user in a self-service, subscription-based, elastically scalable, reliable, highly available, and secure manner. An example of such a cloud infrastructure system is the Oracle Public Cloud provided by the present assignee.

Cloud infrastructure system 1102 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1102 may be adapted to automatically provision, manage and track a user's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle Corporation) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under SaaS category, PaaS category, IaaS category, or other categories of services including hybrid services. A user, via a subscription order, may order one or more services provided by cloud infrastructure system 1102. Cloud infrastructure system 1102 then performs processing to provide the services in the user's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, users can utilize applications executing on the cloud infrastructure system. Users can acquire the application services without the need for users to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Users can acquire the PaaS services provided by cloud infrastructure system 1102 without the need for users to purchase separate licenses and support. Examples of platform services include, without limitation, Oracle Java Cloud Service (JCS), Oracle Database Cloud Service (DBCS), and others.

By utilizing the services provided by the PaaS platform, users can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer users a Database as a Service in the form of a database cloud. Middleware cloud services may provide a platform for users to develop and deploy various business applications, and Java cloud services may provide a platform for users to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for users utilizing services provided by the SaaS platform and the PaaS platform.

In certain embodiments, cloud infrastructure system 1102 may also include infrastructure resources 1130 for providing the resources used to provide various services to users of the cloud infrastructure system. In one embodiment, infrastructure resources 1130 may include pre-integrated and optimized combinations of hardware, such as servers, storage, and networking resources to execute the services provided by the PaaS platform and the SaaS platform, and other resources.

In some embodiments, resources in cloud infrastructure system 1102 may be shared by multiple users and dynamically re-allocated per demand. Additionally, resources may be allocated to users in different time zones. For example, cloud infrastructure system 1102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 to enable provision of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a user's subscription received by cloud infrastructure system 1102, and the like.

In one embodiment, as depicted in FIG. 14, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In an exemplary operation, at 1134, a user using a client device, such as computing devices 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the user may access a cloud User Interface (UI) such as cloud UI 1112, cloud UI 1114 and/or cloud UI 1116 and place a subscription order via these UIs. The order information received by cloud infrastructure system 1102 in response to the user placing an order may include information identifying the user and one or more services offered by the cloud infrastructure system 1102 that the user intends to subscribe to.

At 1136, the order information received from the user may be stored in an order database 1118. If this is a new order, a new record may be created for the order. In one embodiment, order database 1118 can be one of several databases operated by cloud infrastructure system 1118 and operated in conjunction with other system elements.

At 1138, the order information may be forwarded to an order management module 1120 that may be configured to perform billing and accounting functions related to the order, such as verifying the order, and upon verification, booking the order.

At 1140, information regarding the order may be communicated to an order orchestration module 1122 that is configured to orchestrate the provisioning of services and resources for the order placed by the user. In some instances, order orchestration module 1122 may use the services of order provisioning module 1124 for the provisioning. In certain embodiments, order orchestration module 1122 enables the management of business processes associated with each order and applies business logic to determine whether an order should proceed to provisioning.

As shown in the embodiment depicted in FIG. 14, at 1142, upon receiving an order for a new subscription, order orchestration module 1122 sends a request to order provisioning module 1124 to allocate resources and configure resources needed to fulfill the subscription order. Order provisioning module 1124 enables the allocation of resources for the services ordered by the user. Order provisioning module 1124 provides a level of abstraction between the cloud services provided by cloud infrastructure system 1100 and the physical implementation layer that is used to provision the resources for providing the requested services. This enables order orchestration module 1122 to be isolated from implementation details, such as whether or not services and resources are actually provisioned on the fly or pre-provisioned and only allocated/assigned upon request.

At 1144, once the services and resources are provisioned, a notification may be sent to the subscribing users indicating that the requested service is now ready for use. In some instance, information (e.g. a link) may be sent to the user that enables the user to start using the requested services.

At 1146, a user's subscription order may be managed and tracked by an order management and monitoring module 1126. In some instances, order management and monitoring module 1126 may be configured to collect usage statistics regarding a user use of subscribed services. For example, statistics may be collected for the amount of storage used, the amount data transferred, the number of users, and the amount of system up time and system down time, and the like.

In certain embodiments, cloud infrastructure system 1100 may include an identity management module 1128 that is configured to provide identity services, such as access management and authorization services in cloud infrastructure system 1100. In some embodiments, identity management module 1128 may control information about users who wish to utilize the services provided by cloud infrastructure system 1102. Such information can include information that authenticates the identities of such users and information that describes which actions those users are authorized to perform relative to various system resources (e.g., files, directories, applications, communication ports, memory segments, etc.) Identity management module 1128 may also include the management of descriptive information about each user and about how and by whom that descriptive information can be accessed and modified.

Figure 15:
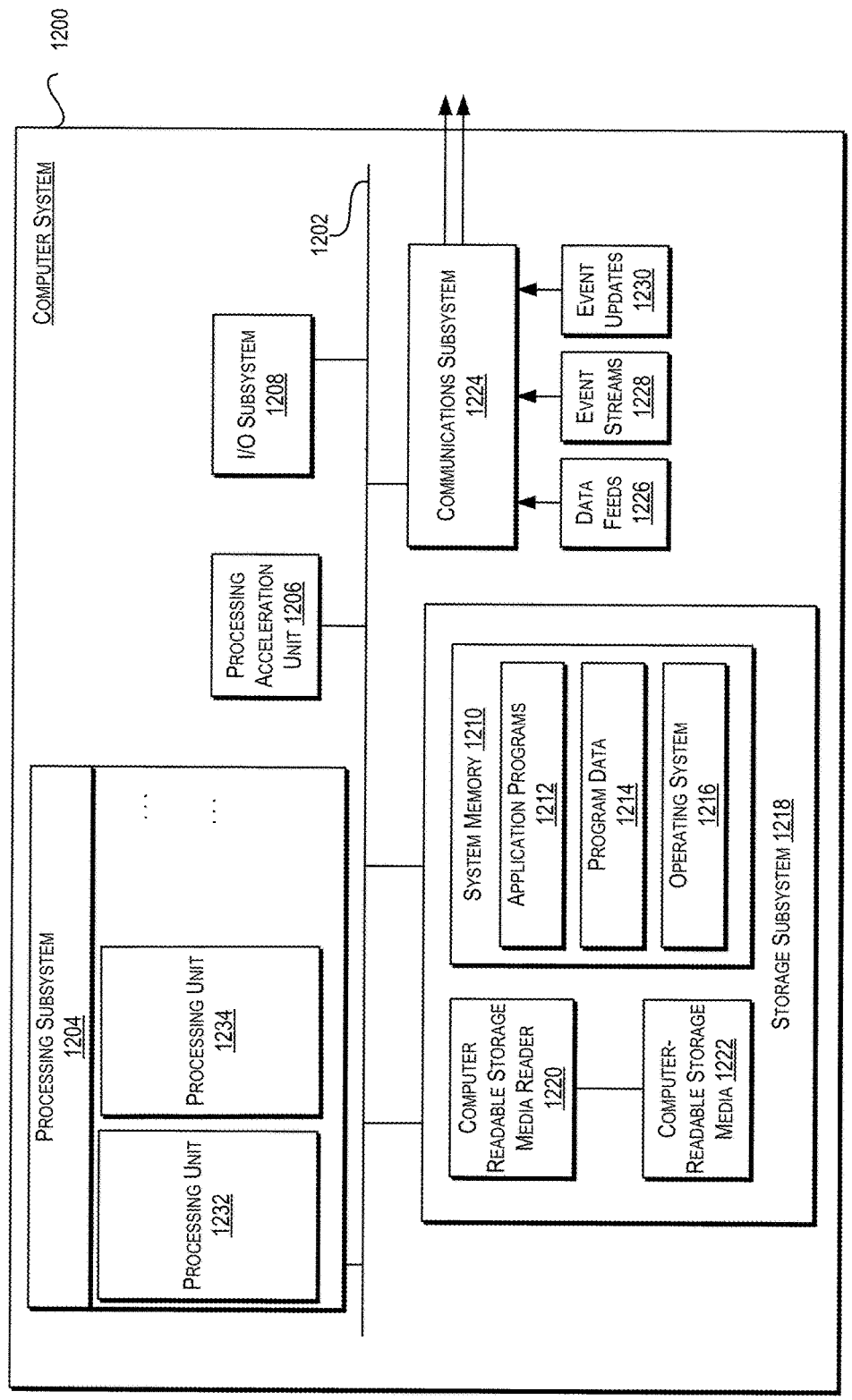
FIG. 15 illustrates an exemplary computer system that may be used to implement an embodiment of the present invention.

FIG. 15 illustrates an exemplary computer system 1200 that may be used to implement an embodiment of the present invention. In some embodiments, computer system 1200 may be used to implement any of the various servers and computer systems described above. As shown in FIG. 15, computer system 1200 includes various subsystems including a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 may include tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processing units 1232, 1234, etc. A processing unit may include be one or more processors, including single core or multicore processors, one or more cores of processors, or combinations thereof. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 810 including potentially on one or more storage devices. Through suitable programming, processing subsystem 1204 can provide various functionalities described above for placement, contribution, and/or demand policy-based resource allocation.

In certain embodiments, a processing acceleration unit 1206 may be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term "input device" is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information that is used by computer system 1200. Storage subsystem 1218 provides a tangible non-transitory computer-readable storage medium for storing the basic programming and data constructs that provide the functionality of some embodiments. Software (programs, code modules, instructions) that when executed by processing subsystem 1204 provide the functionality described above may be stored in storage subsystem 1218. The software may be executed by one or more processing units of processing subsystem 1204. Storage subsystem 1218 may also provide a repository for storing data used in accordance with the present invention.

Storage subsystem 1218 may include one or more non-transitory memory devices, including volatile and non-volatile memory devices. As shown in FIG. 15, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM) or dynamic random access memory (DRAM).

By way of example, and not limitation, as depicted in FIG. 15, system memory 1210 may store application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1222 may store programming and data constructs that provide the functionality of some embodiments. Software (programs, code modules, instructions) that when executed by processing subsystem 1204 a processor provide the functionality described above may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1222 may provide storage of computer-readable instructions, data structures, program modules, and other data for computer system 1200.

In certain embodiments, storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for storing computer-readable information.

In certain embodiments, computer system 1200 may provide support for executing one or more virtual machines. Computer system 1200 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1200. Accordingly, multiple operating systems may potentially be run concurrently by computer system 1200. Each virtual machine generally runs independently of the other virtual machines.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more computing devices via the Internet for receiving and sending information from and to the computing devices.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, communications subsystem 1224 may receive input communication in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1200 depicted in FIG. 15 is intended only as a specific example. Many other configurations having more or fewer components than the system depicted in FIG. 15 are possible. Based on the disclosure and teachings provided herein, a person of ordinary skill in the art will appreciate other ways and/or methods to implement the various embodiments.

According to one embodiment, there is provided a computer system comprising the communication subsystem 1224 and the processing subsystem 1204 coupled with the communication subsystem 1224. The processing subsystem 1204 is configured to receive via the communication subsystem 1224 an order by a user for a service, wherein the service is enabled in part by allocation of a resource. The processing subsystem 1204 is further configured to: parse the order to identify request data comprising a requestor, the resource, and a request time; and add the request data to an aggregate data structure. The aggregate data structure includes an aggregate of the request data for previously parsed orders. The processing subsystem 1204 is further configured to: determining a value indicating a real-time demand for the resource based on the aggregate data structure; correlate the order with at least one other order from the previously parsed orders based on at least one component of the request data being the same between the order and the at least one other order; and identifying at least one resource set based on the correlating of the order with the at least one other order, wherein the at least one resource set includes the resource from the order and another resource requested from the at least one other order.

According to one embodiment, the parsing comprises building a data structure from the request data that provides a structural representation of the requestor, the resource, and the request time.

According to one embodiment, the aggregate data structure comprises the data structure from the parsed order and one or more data structures from the previously parsed orders.

According to one embodiment, the value indicating the real-time demand for the resource is determined using a current request volume for the resource obtained from the aggregate of the request data for the previously parsed orders.

According to one embodiment, the processing subsystem 1204 is further configured to: generate or update one or more demand policies for allocation of the resource based on the determined value indicating the real-time demand for the resource; pre-create the resource based on the one or more demand policies; and allocate via the communication subsystem 1224 the pre-created resource to one or more users based on the one or more demand policies.

According to one embodiment, the determining the value indicating the real-time demand comprises determining a percentage of orders that include the resource within a particular time period using the aggregate of the request data for the previously parsed orders.

According to one embodiment, the determining the value indicating the real-time demand further comprises correlating the determined percentage of orders to the real-time demand of the resource relative to other resources with a resource pool using the aggregate of the request data for the previously parsed orders.

According to one embodiment, the at least one component of the request data includes the requestor.

According to one embodiment, the processing subsystem 1204 is further configured to identify an additional resource that is regularly requested in addition to the resource and the another resource based on a percentage of the previously parsed orders that include the resource, the another resource, and the additional resource.

According to one embodiment, the processing subsystem 1204 is further configured to update the identified at least one resource set to include the additional resource.

According to one embodiment, the processing subsystem 1204 is further configured to: generate or update one or more demand policies for allocation of the at least one resource set; pre-create the resource and the another resource wired together based on the one or more demand policies; and allocate via the communication subsystem 1224 the at least one resource set including the resource and the another resource wired together to one or more users based on the one or more demand policies.

According to one embodiment, there is provided a resource manager 105; 305; 505; 905; 975 comprising a demand monitor 575 configured to determine a value indicating a real-time demand for a resource within a resource pool based on an aggregate of request data. The aggregate of the request data is obtained from any number of previously received orders for services that included the resource as at least a part of enabling the service. The resource manager 105; 305; 505; 905; 975 further comprises a policy manager 335; 525; 935 configured to generate or update one or more demand policies for allocation of the resource based on the determined value indicating the real-time demand for the resource. The resource manager 105; 305; 505; 905; 975 is configured to pre-create the resource based on the one or more demand policies, and allocate the pre-created resource to one or more users based on the one or more demand policies.

According to one embodiment, the value indicating the real-time demand for the resource is determined using a current request volume for the resource obtained from the aggregate of the request data.

According to one embodiment, the determining the value indicating the real-time demand comprises determining a percentage of orders that include the resource within a particular time period using the aggregate of the request data for the previously received orders.

According to one embodiment, determining the value indicating the real-time demand further comprises correlating the determined percentage of orders to the real-time demand of the resource relative to other resources with the resource pool using the aggregate of the request data for the previously received orders According to one embodiment, the resource manager 105; 305; 505; 905; 975 is further configured to add the pre-created resource to the resource pool.

According to one embodiment, the resource manager 105; 305; 505; 905; 975 is further configured to update the resource pool to indicate the allocation of the pre-created resource to the one or more users.

According to one embodiment, there is provided a computer system comprising the communication subsystem 1224 and the processing subsystem 1204 coupled with the communication subsystem 1224. The processing subsystem 1204 is configured to determine a value indicating a real-time demand for a resource within a resource pool based on an aggregate of request data. The aggregate of the request data is obtained from any number of previously received orders for services that included the resource as at least a part of enabling the services. The processing subsystem 1204 is further configured to: correlate an order for a service with at least one other order from the previously received orders based on at least one component of the request data being the same between the order and the at least one other order; and identify at least one resource set based on the correlating of the order with the at least one other order. The at least one resource set includes the resource from the order and another resource requested from the at least one other order. The processing subsystem 1204 is further configured to: track utilization of the resource within the resource pool; generate or update one or more demand policies for allocation of resource based on at least one of: (i) the determined value indicating the real-time demand for the resource, (ii) the at least one resource set that includes the resource, and (iii) the tracked utilization for the resource; and (i) pre-create the resource, (ii) add the resource to the resource pool, (iii) clean the resource, based on the one or more demand policies.

According to one embodiment, the processing subsystem 1204 is further configured to allocate via the communication subsystem 1224 the resource to one or more users based on the one or more demand policies.

According to one embodiment, the value indicating the real-time demand for the resource is determined using a current request volume for the resource obtained from the aggregate of the request data for the previously received orders.

Although specific embodiments of the invention have been described, various modifications, alterations, alternative constructions, and equivalents are also encompassed within the scope of the invention. The modifications include any relevant combination of the disclosed features. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
    receiving, by a computing system, an order by a user for a service, wherein the service is enabled in part by allocation of a resource;
    parsing, by the computing system, the order to identify request data comprising a requestor, the resource, and a request time;
    adding, by the computing system, the request data to an aggregate data structure, wherein the aggregate data structure includes an aggregate of the request data for previously parsed orders;
    determining, by the computing system, a value indicating a real-time demand for the resource based on the aggregate data structure;
    correlating, by the computing system, the order with at least one other order from the previously parsed orders based on at least one component of the request data being the same between the order and the at least one other order;
    identifying, by the computing system, at least one resource set based on the correlating of the order with the at least one other order, wherein the at least one resource set includes the resource from the order and another resource requested from the at least one other order;
    generating or updating, by the computing system, one or more demand policies for allocation of the at least one resource set based on the determined value indicating the real-time demand for the resource and the correlation of the order with the at least one other order;
    pre-creating, by the computing system, the resource from the order and the another resource requested from the at least one other order based on the one or more demand policies; and
    allocating, by the computing system, the pre-created resource and the another resource to one or more users based on the one or more demand policies.

2. The method of claim 1, wherein the parsing comprises building a data structure from the request data that provides a structural representation of the requestor, the resource, and the request time.

3. The method of claim 2, wherein the aggregate data structure comprises the data structure from the parsed order and one or more data structures from the previously parsed orders.

4. The method of claim 1, wherein the value indicating the real-time demand for the resource is determined using a current request volume for the resource obtained from the aggregate of the request data for the previously parsed orders.

5. The method of claim 1, wherein the determining the value indicating the real-time demand comprises determining a percentage of orders that include the resource within a particular time period using the aggregate of the request data for the previously parsed orders.

6. The method of claim 5, wherein the determining the value indicating the real-time demand further comprises correlating the determined percentage of orders to the real-time demand of the resource relative to other resources with a resource pool using the aggregate of the request data for the previously parsed orders.

7. The method of claim 1, wherein the at least one component of the request data includes the requestor.

8. The method of claim 1, further comprising identifying, by the computing system, an additional resource that is regularly requested in addition to the resource and the another resource based on a percentage of the previously parsed orders that include the resource, the another resource, and the additional resource.

9. The method of claim 8, further comprising updating, by the computing system, the identified at least one resource set to include the additional resource.

10. A non-transitory machine readable storage medium having instructions stored thereon that when executed by one or more processors cause the one or more processors to perform a method comprising:
    determining a value indicating a real-time demand for a resource within a resource pool based on an aggregate of request data, wherein the aggregate of the request data is obtained from any number of previously received orders for services that included the resource as at least a part of enabling the service;
    generating or updating one or more demand policies for allocation of the resource based on the determined value indicating the real-time demand for the resource;
    pre-creating the resource based on the one or more demand policies; and
    allocating the pre-created resource to one or more users based on the one or more demand policies.

11. The non-transitory machine readable storage medium of claim 10, wherein the value indicating the real-time demand for the resource is determined using a current request volume for the resource obtained from the aggregate of the request data.

12. The non-transitory machine readable storage medium of claim 10, wherein the determining the value indicating the real-time demand comprises determining a percentage of orders that include the resource within a particular time period using the aggregate of the request data for the previously received orders.

13. The non-transitory machine readable storage medium of claim 12, wherein the determining the value indicating the real-time demand further comprises correlating the determined percentage of orders to the real-time demand of the resource relative to other resources with the resource pool using the aggregate of the request data for the previously received orders.

14. The non-transitory machine readable storage medium of claim 10, wherein the method further comprise adding the pre-created resource to the resource pool.

15. The non-transitory machine readable storage medium of claim 10, wherein the method further comprise updating the resource pool to indicate the allocation of the pre-created resource to the one or more users.

16. A system comprising:
one or more processors and non-transitory machine readable storage medium;
program instructions to determine a value indicating a real-time demand for a resource within a resource pool based on an aggregate of request data, wherein the aggregate of the request data is obtained from any number of previously received orders for services that included the resource as at least a part of enabling the services;
program instructions to correlate an order for a service with at least one other order from the previously received orders based on at least one component of the request data being the same between the order and the at least one other order;
program instructions to identify at least one resource set based on the correlating of the order with the at least one other order, wherein the at least one resource set includes the resource from the order and another resource requested from the at least one other order;
program instructions to track utilization of the resource within the resource pool;
program instructions to generate or update one or more demand policies for allocation of resource based on at least one of: (i) the determined value indicating the real-time demand for the resource, (ii) the at least one resource set that includes the resource, and (iii) the tracked utilization for the resource;
program instructions to at least one of: (i) pre-create the resource, (ii) add the resource to the resource pool, (iii) clean the resource, based on the one or more demand policies; and
program instructions to allocate the resource and the another resource to one or more users based on the one or more demand policies,
wherein the program instructions are stored on the non-transitory machine readable storage medium for execution by the one or more processors.

17. The system of claim 16, wherein the value indicating the real-time demand for the resource is determined using a current request volume for the resource obtained from the aggregate of the request data for the previously received orders.

* * * * *

UNITED STATES PATENT AND TRADEMARK OFFICE
CERTIFICATE OF CORRECTION

PATENT NO. : 9,961,017 B2  
APPLICATION NO. : 14/819815  
DATED : May 1, 2018  
INVENTOR(S) : Jacob et al.

Page 1 of 1

It is certified that error appears in the above-identified patent and that said Letters Patent is hereby corrected as shown below:

On the Title Page

Column 2, item (57) under Abstract, Line 2, delete "provisoning" and insert -- provisioning --, therefor.

Column 2, item (57) under Abstract, Line 4, delete "provisoning" and insert -- provisioning --, therefor.

In the Specification

In Column 1, Line 58, delete "provisoning" and insert -- provisioning --, therefor.

In Column 1, Line 60, delete "provisoning" and insert -- provisioning --, therefor.

In Column 3, Line 1, delete "Optionaly," and insert -- Optionally, --, therefor.

In Column 8, Line 3, delete "120-D." and insert -- 120D. --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*